Feb. 4, 1958 W. C. BRINTON 2,822,158

METHOD OF FLUID MINING

Filed March 5, 1949 10 Sheets-Sheet 1

Inventor
Willard C. Brinton
by Moses, Nolte, Crews & Berry
Attorneys

Inventor
Willard C. Brinton
by Moses, Nolte, Crews + Berry
Attorneys

METHOD OF FLUID MINING

Filed March 5, 1949

Inventor
Willard C. Brinton by Moses, Nolte, Crews & Berry
Attorneys

Feb. 4, 1958 W. C. BRINTON 2,822,158

METHOD OF FLUID MINING

Filed March 5, 1949 10 Sheets-Sheet 4

Inventor
Willard C. Brinton by Moses, Nolte, Crews & Berry
Attorneys.

Feb. 4, 1958 W. C. BRINTON 2,822,158

METHOD OF FLUID MINING

Filed March 5, 1949 10 Sheets-Sheet 5

Inventor
Willard C. Brinton
by Moses, Nolte, Crews + Berry
Attorneys

Feb. 4, 1958 W. C. BRINTON 2,822,158

METHOD OF FLUID MINING

Filed March 5, 1949 10 Sheets-Sheet 6

Inventor
Willard C. Brinton
by Moses, Nolte, Crews + Berry
Attorneys

METHOD OF FLUID MINING

Filed March 5, 1949 10 Sheets-Sheet 7

Inventor
Willard C. Brinton
by Moses, Nolte, Crews & Berry
Attorneys

Feb. 4, 1958 W. C. BRINTON 2,822,158

METHOD OF FLUID MINING

Filed March 5, 1949 10 Sheets-Sheet 8

Inventor
Willard C. Brinton
by Moses, Nolte, Crews & Berry
Attorneys

Inventor
Willard C. Brinton
by Moses, Nolte, Crews & Berry
Attorneys

Feb. 4, 1958 W. C. BRINTON 2,822,158

METHOD OF FLUID MINING

Filed March 5, 1949 10 Sheets-Sheet 10

Inventor
Willard C. Brinton
by Moses, Nolte, Crews & Berry
Attorneys 2,822,158

METHOD OF FLUID MINING

Willard C. Brinton, New York, N. Y.

Application March 5, 1949, Serial No. 79,856
13 Claims. (Cl. 262—3)

This invention relates to methods for mining by the use of fluids under pressure. It is particularly directed to the extraction of values found in strata at such distances below the surface of the earth that it is more economical to extract the values by means of deep wells or bore holes than by the use of shafts large enough to permit miners to go down into the mine. The strata containing the values frequently extend under large areas of the earth's surface and it is desirable to sink as few wells as possible, and therefore, as large an area should be mined from each well as can be done.

The present invention is particularly applicable to the mining of soluble deposits, such as salt, potash, and particularly trona, such, for example, as that found in the State of Wyoming. The invention in many of its aspects is also applicable to the mining or extraction of values from deposits of more or less loose granular or friable material, such as oil-bearing sands, in which the oil may be extracted by solvents or washed out with hot water or other suitable liquid vehicles. In dealing with such soluble or loose materials, special problems are encountered differing from those which are met with in mining or drilling through rock formations which are of a self-sustaining character. For example, in a deposit of salt or other strictly soluble material, it is important to form the underground workings and apply the solvents in such manner as to continuously bring the solvent into contact with the material to be mined in the most efficient manner. Care must be taken to avoid premature collapsing of the roof of the subterranean cavity, thereby blocking proper flow of the solvents and slowing up the action. In the case of materials which are wholly or partly insoluble, only a certain proportioning of the deposit being valuable, as in the case, for example, of oil-bearing sands, it is desirable to extract the oil while leaving the worthless part of the material, such as the sand, in the ground; thus to make it unnecessary to lift to the surface large volumes of waste material.

In accordance with the present invention, a well or bore is drilled downward until it reaches the stratum to be mined. This well may be drilled and cased in accordance with usual well drilling practices. In order to mine as large an area as possible from a single well, a pipe or pipes are then passed down the well, the pipe or at least the lower part thereof being of such flexibility that it may be caused to bend laterally so that it may be progressively advanced in the general plane of the stratum to substantial distances from the axis of the well. This is accomplished by providing a pipe which may be termed a "probing pipe," or a pipe with a "probing nozzle" at its end. Such pipe must have sufficient stiffness so that it can be pushed downwardly and outwardly, the solvent being at the same time forced through it so as to open a passage for the nozzle as the nozzle is advanced. The pipe must have a sufficient degree of rigidity to enable it to be so advanced, and it must also have a certain amount of flexibility in at least one plane passing through the axis of the pipe to enable it to follow the plane of the stratum and therefore to bend more or less in a direction at right angles to the axis of the well or bore. With such a pipe forced from above and simultaneously feeding the solvent or erosive liquid to the end of the lateral hole which it is forming, the probing nozzle may be advanced to great distances, perhaps a matter of hundreds, or even thousands of feet, from the axis of the bore. In general, the greater the dip of the stratum, the greater the distance the probing nozzle may be advanced.

It is not sufficient, however, merely to be able to advance the probing nozzle in a haphazard lateral direction or even in a single radial direction. The invention, therefore, contemplates controlling the direction of lateral advance of the probing nozzle. This is preferably accomplished by utilizing a pipe which, while having sufficient flexibility in one axial plane to permit the pipe to follow the direction of the stratum, has sufficient rigidity in a second axial plane at right angles to said first axial plane to enable it to resist deviation to the right or left of a desired radial path which it is intended that the probing nozzle shall take. Various ways of providing a pipe having the desired flexibility and stiffness characteristics are within the scope of the invention. For example, commercial flexible metal pipe may be utilized. As such pipe is equally flexible in all directions, means are provided for rendering it resistant to flexure, except in one axial plane. This may be accomplished by attaching to the pipe a flat strip of steel which will bend with the pipe to permit it to advance parallel to the stratum but which will resist bending in an axial plane at right angles to the axial plane of the bending. Such a pipe, therefore, may be forced down and caused to bend into the plane of the stratum and pushed out radially without deviating substantially from a predetermined radial direction.

Such a strip of steel also performs other important functions. It serves as a skid or "ski" providing a surface which will facilitate the outward movement of the pipe in the plane of the strata. It also assists in supporting the weight of the flexible pipe sections. In a deep well, obviously, many sections of pipe are required which must be coupled together, and the weight of the column may be such that the tensile strength of the pipe is insufficient to support the column. For example, if ordinary commercial flexible pipe of the helically wound type is used, the convolutions of the pipe may be either wholly pulled apart or separated sufficiently to permit leakage. If the pipe is anchored to the steel strip at intervals, as, for example, at each coupling, then each pipe section only has to sustain its own weight which is transferred through the coupling to the long steel strip. This permits the use of a column of any required number of pipe sections, as the steel strip may be made of such section as to provide the necessary tensile strength for supporting the entire column.

Another type of tubing having similar bending characteristics consists of a steel tube or pipe which is partially flattened so as to give it a generally flattened or elliptical cross-section. Such a pipe will bend without difficulty in an axial plane passing through the minor axis of the ellipse but will be substantially rigid or resistant to bending in an axial plane passing through the major axis of the ellipse. Such flattened or elliptical pipe may be formed into a nozzle at its end or any suitable nozzle attached thereto, and it may be formed in sections which may be welded together as the pipe is advanced down the well, or the sections may be secured together with suitable couplings. In particular, the pipe section may be left round at each end so that screw couplings of conventional type may be utilized.

It is ordinarily not sufficient to provide a probing pipe which may be advanced only in a single radial direction. The pipe should be successively advanced in a plurality of spaced radial directions so as to reach large areas surrounding the central well, and in order to accomplish this result, the invention provides means for indexing the probing pipe so that it may be successively advanced in different predetermined radial paths. This may be accomplished by use of an indexing tube extending down the well between the casing and the flexible pipe. The indexing may be accomplished by turning the indexing tube through definite angles, as indicated by a compass dial at the top of the well. However, as in a deep shaft the tube may twist very substantially between the upper and lower ends thereof, such twist amounting in some instances to several complete revolutions, it is difficult to determine the true orientation of the probing nozzle by adjusting the angle of the index tube at its upper end. The invention therefore contemplates the provision of means for determining the orientation of the lower end of the indexing tube and then utilizing means at the lower end of said tube for determining the orientation of the flexible pipe and probing nozzle. In this way, the radial direction of the passages or tunnels extending from the central well may be definitely and positively controlled. Such definite and positive control not only insures that all desired portions of the strata may be attacked, but also permits spaces to be left between the laterally formed passages or tunnels which provide pillars for supporting the roof of the working so as to prevent premature collapse thereof.

In accordance with the present invention, the flexible tube or probing nozzle is preferably caused to move out from a central well at a level immediately above the surface of the floor stratum underlying the stratum of soluble or loose material which is to be mined. Such floor stratum is almost always of a solid or rock-like character, or at least of a relatively firm and insoluble formation as compared with the stratum to be worked, and the flexible pipe and probing nozzle are caused to form a passage in the lowest portion of the soluble stratum so that the probing nozzle may actually be directed outwardly along the upper surface of the floor stratum. The invention provides for the accomplishment of this purpose by using pipe having flexibility characteristics which cause it to travel along the surface of the floor stratum. For example, if the flexible pipe is provided with a flat steel plate attached to it as described, such steel plate may have sufficient resiliency to tend to straighten out and thereby to be bent only to the extent to which it is deflected by contact with the floor stratum. The steel plate, in that case, acts as a sort of ski, sliding on the surface of the floor stratum and guiding the probing nozzle so that it forms a channel or tunnel in the bottom of the soluble stratum. The same result is accomplished where the elliptical or flattened pipe is used, such flattened pipe having a natural resiliency urging it downwardly so that it will slide along the surface of the floor stratum.

The formation of the initial lateral channels or tunnels at the bottom of the soluble stratum is an important feature of the invention, as it enables the solvent or extracting liquid to operate most efficiently. The fresh solvent issuing from the end of the probing nozzle attacks the material to be dissolved most effectively and causes the more or less saturated solvent to flow backwardly at the sides of and above the probing nozzle towards the central well from which the brine is withdrawn. Thus, conditions for rapid advancement of the nozzle are most favorable and at the same time the attack on the roof of the channel near the central bore is minimized, as at that point the solution has become more concentrated and therefore the solvent action is reduced. Thus, the general character of the laterally extending cavity is preserved and the roof material does not tend to collapse near the central bore, which would interfere with continued operation at substantial distances from such bore.

As above stated, my invention is particularly applicable to operations involving the use of deep drilled wells which are of comparatively small diameter. The probing pipe is passed down such a well, or if an indexing tube is used, it is passed down through the indexing tube and the relative diameters of the well, or tube, if used, and of the probing pipe, are such that the probing pipe receives substantial lateral support from the well casing or tube. This prevents the vertical part of the probing pipe from bending or buckling to the point of collapse. The walls of the laterally extending passages or tunnels formed by the advance of the probing pipe may also be used to provide a similar support against buckling of the laterally extending part of the probing pipe. This is particularly true where conditions permit of a rapid advance of the probing pipe which can be forced to considerable distances before the tunnel is enlarged by the flow of the returning solvent liquid to a degree where substantial support against buckling is no longer provided.

The fact that the present invention provides a way in which lateral channels or tunnels may be formed which extend in a predetermined direction from the well, makes it possible to link up a series of wells which may be at very substantial distances from one another. By driving directional channels from each of such wells, they may still be brought into communication so that one well may be used for introduction of the solvent and the connected well used for withdrawal of the brine. In this way, the solvent may be caused to flow through considerable distances in direct contact with the material to be dissolved, thereby producing a very effective action in extracting the minerals to be recovered. When such a system is established, it is unnecessary to maintain a hydrostatic head throughout the underground workings, so that the workings do not have to be filled with the solvent. This greatly reduces the quantity of solvent which is required, this being an important feature where water of suitable purity is scarce, or where a non-aqueous solvent or a solvent containing special reagents is employed. It is also important where use of a hot solvent or liquid vehicle is desirable, because there is a smaller volume of liquid to be maintained at temperature and the temperatures may be very much more easily and accurately controlled.

In the art of mining by aqueous solvents, the practice is sometimes followed of passing air with the aqueous solvent into a large cavity or pool in the deposit at the bottom of the shaft. The function of the air is to prevent the solvent from contacting and weakening the roof of the formed cavity until such time as the cavity has been enlarged laterally as far as practicable. This method of mining has found application in obtaining sodium chloride from subterranean deposits and has been suited for the purpose because of the great thickness of the deposits. In my invention, on the other hand, I have greatly extended the applicability of such a process by enabling air to be used effectively in connection with the working of thin strata. My invention contemplates the use, where necessary, of compressed air, either introduced in the solvent liquid or separately supplied, so as to keep down the level of the solvent in the lateral cavities, thereby reducing the quantity of solvent in the workings and protecting the roofs of the cavities from undue weakening. The use of air in this manner is not always required, but may be employed in some instances, particularly where highly soluble material, such as salt, is being mined.

In some instances, other inert gases than air may be used. The term "air" as used herein, is intended to include any such inert gas. It is also possible under some conditions to use an inert liquid lighter than the aqueous solvent to prevent the solvent from contacting the roof of the cavity. Such inert liquid should float on the surface of the solvent and should be of such nature as not to form a gummy or other deposit on the surface of the soluble material which would prevent effective action of the solvent liquid thereon where such action is desired. Examples of liquids which are suitable under certain conditions, are light petroleum distillates.

The introduction of air with the solvent liquid, particularly where pressure is used, is important in my invention where the stream of liquid and air is directed by a probing pipe or nozzle against the wall of the material to be mined, particularly against the lateral wall at the end of a transverse bore or tunnel. The air released at the end of such probing pipe or nozzle agitates the liquid and surrounding material in course of removal from the wall and promotes the release of such material and its solution in the solvent if it is soluble material. The air assists the jet of liquid in preventing concentration of the solution in the vicinity of the nozzle from reaching a saturation point where the solvent action is decreased. My invention also contemplates the introduction of air under pressure into the liquid intermittently so that it will be discharged in bursts, thereby producing a greater agitation or explosive effect.

As the strength of the solution increases adjacent to the end of the probing pipe or nozzle, any air which may be dissolved in the solvent liquid will tend to be released, and if conditions are more or less quiescent, it may accumulate in small bubbles, so as to form a sort of film or protective covering over the face of the working. This interferes with the direct contact of the solvent with the material to be dissolved and decreases the rate of solution or erosion. The introduction of substantial quantities of undissolved air with the liquid, particularly if such air is introduced intermittently, as described above, serves, with the flow of the liquid itself, to displace the film which may be formed and ensure that the surface of the working shall be exposed to the full solvent action.

My invention is also concerned with an improved method of recovering values from comparatively thin strata by providing a plurality of communicating holes or bores leading thereto, at least one of which bores is inclined. In so proceeding, the first hole is drilled comparatively vertically thereby to locate the stratum, and then at a suitable distance therefrom a second hole is drilled in a direction inclined or curving toward the intersection of a stratum and said first hole. By enlarging the cavity at the intersection with the stratum of the first drill hole, if necessary, and by employing known directional drilling methods for the second hole, communication may be established between the two holes through the stratum without difficulty. Such inclined hole has the advantage that its angle of intersection with the stratum is much less than a right angle. This enables a comparatively stiff probing pipe, for example, introduced through the inclined hole, to make the necessary bend into the stratum, and to follow the same along the floor thereof until the region of the first hole is reached and beyond such point, if desired. This having been done, the removal of the material may be accomplished by feeding the solvent through the probing pipe and removing it through either the vertical or inclined hole.

It is also a further object of my invention to take advantage of comparatively thin sloping strata to cause the solvent to enter the stratum at a high point therein and to be removed from a lower point laden with the material to be recovered, such gravity flow causing progressive removal of the material to be recovered. My invention as outlined above is also readily adapted for mining material occurring in strata which may be strongly inclined to the horizontal.

Other objects and advantages of the invention will appear in the course of the following description of certain preferred embodiments of the invention chosen to illustrate the principles thereof and the best modes now known to me for practicing the same.

The invention is illustrated more or less diagrammatically in the accompanying drawings, wherein.

Figures 1, 2:
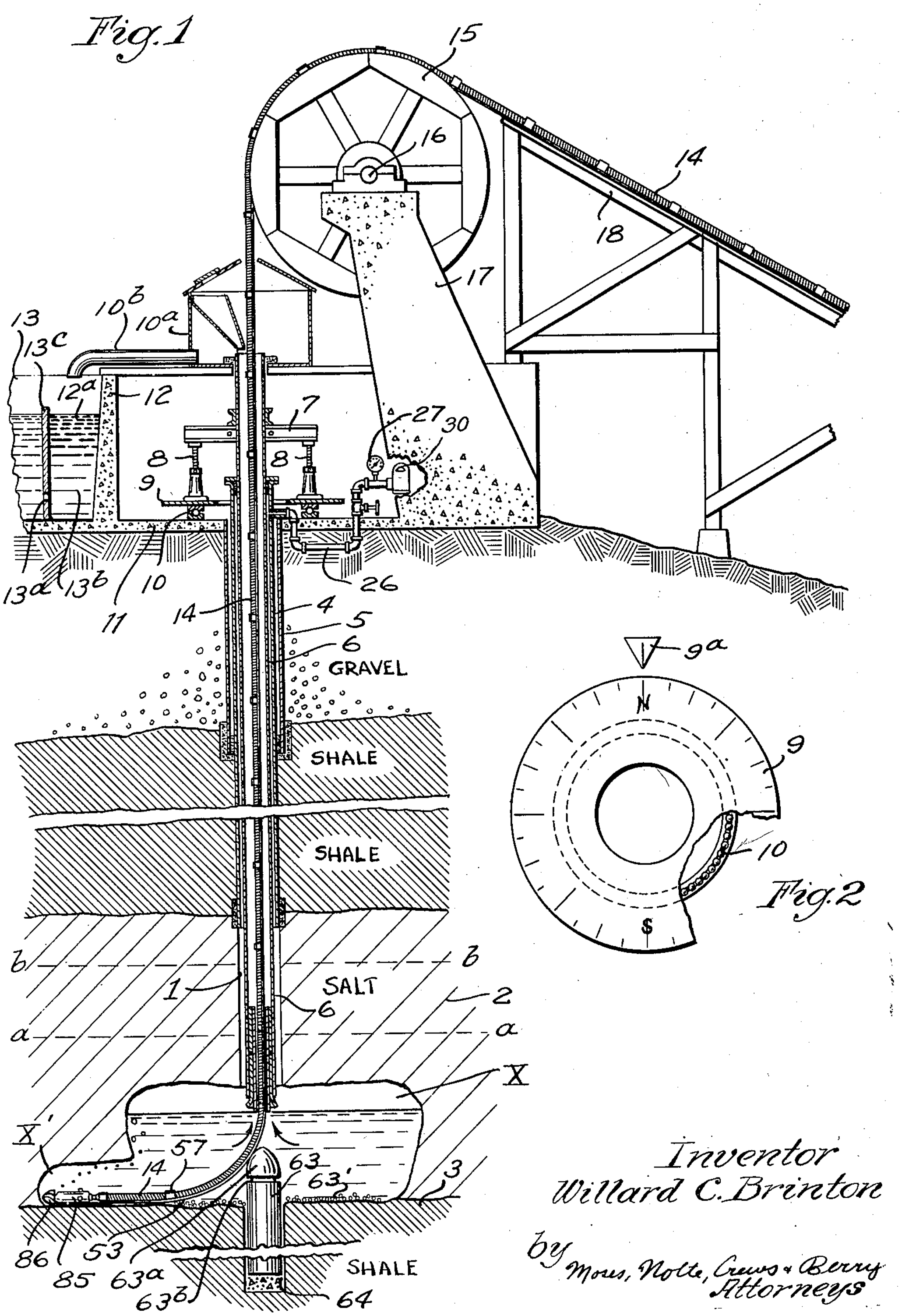
Fig. 1 is a diagrammatic vertical section illustrating one form of apparatus.
Fig. 2 is a plan view with parts broken away showing the indexing mechanism.

In general, the apparatus used comprises a mechanism for supplying a fluid which may be a solvent or a vehicle or a pressure medium in a stratum below the surface of the earth. The device is therefore associated with a drilled well or hole and with a more or less conventional liner for that hole. The means for introducing the dissolving or cutting fluid includes a flexible tubular member which is lowered into the bore hole to the desired depth for operation on the selected stratum. Some means is provided for raising the suspended material from the stratum to a collection means. The apparatus shown generally in Figures 1 to 6 comprises such a means. As shown in those figures, a well 1 has been drilled into the earth passing through various strata until the desired stratum to be mined is reached. This stratum is indicated by the numeral 2. The stratum 2 rests upon a floor stratum 3 of shale or undesired material which may be relatively solid or insoluble. The word "salt" has been applied to the stratum 2 and is not limited in its meaning to sodium chloride, but is to be taken generally as meaning any material which can be dissolved by a suitable solvent or attacked by a fluid medium and which it is desired to recover. 4 is a tubular well lining or casing fixed in position within the bore hole. Such a liner will be made of as many sections of tubing or casing as necessary. At the upper part of the hole or bore, if desired, an outer casing 5 may be placed.

In the particular form here shown, an inner tubular member or "indexing tube" 6 is inserted in the well casing and it is movably mounted, being suspended on a support 7 which is adjustably carried by means of jacks 8 upon an indexing table 9. This table, as shown in Figs. 1 and 2, is supported on anti-friction bearings 10. The bearings are themselves supported upon a foundation 11 within a house or housing 12 adjacent a tank 13 within which the material raised from the well may be deposited. The table 9 may be indexed by any desired mechanism and since such indexing mechanisms are well known, no specific mechanism is shown herewith.

A flexible pipe 14, the correct construction of which will be described below, is inserted within the indexing tube 6 within the well. A constant means for guiding the pipe into or out of the well comprises a wheel 15 carried in suitable bearings 16 on a support 17. The wheel 15 should be of sufficient diameter so that the somewhat flexible pipe may pass over it without being stressed beyond its elastic limit. A support or track 18 is provided which may extend from a point close to the wheel 15, as shown in Figure 1, laterally from the wheel, for any desired distance. The sections of the pipe 14 may be made up into a string of any desired length on this support, and the string then guided over the wheel 15 and down into the well. When the pipe is withdrawn from the well, it can be pulled back over the support 18 and the sections disconnected as desired. A suitable length of flexible pipe is used, dependent upon the depth of the well and the distance to which the lateral tunnel or probing is to be carried out.

The end of the flexible pipe supported on the support 18 may be secured to an arrangement of jointed pipes 19 which at their outer end are connected to a fixed system of piping 20. A block 21 carries the connection between the flexible member 14 and the pipe system 19 and is mounted in a track 22. A cable or other raising and lowering means 23 is joined to the block 21, passes about sheaves 24 and is secured to a drum 25 driven by any desired means. The drum may be driven to raise and lower the flexible pipe 14 up and down within the bore hole. The system of jointed pipes 19 provides a connection from the fixed system of piping 20 to the end of the pipe 14, permitting pressure to be supplied continuously to the pipe 14 while it is being advanced down the well and laterally thereof at its lower end.

As shown in Fig. 1, the space between the liner 4 and index tube 6 is in communication with a pipe system 26. A gauge 27 may be in this system. This system is connected through a pipe 27' to an air tank 28. Air is supplied to this tank through a connection 29 from any suitable source. A safety valve 30 is in communication with the pipe 27' or the pipe system 26. An air meter 31 is connected through the pipe 32 to the tank 28. A gauge 33 may be in communication with the pipe 32, and the valve 34 is also in communication with the pipe 32 and may be used for adjustment.

As above stated, fluid of some sort, and usually liquid, is discharged through the flexible tube or pipe 14 to act upon the material which it is desired to remove from the well and, as stated, this may be a solvent, among which water, various oils, caustic soda solution, and other materials are included. Sometimes, also detergent material including sodium silicate may be used. These materials may be used hot or cold and may be mixed with air or other gases or vapors.

The apparatus shown is such that it is effective to convey into the bottom of the well and into contact with the material which is to be removed whatever fluid substance or mixtures of fluid substances are desired. For this purpose a pump 35 driven by a motor 36 is used. The liquid inlet 37 of the pump may be connected to any source of liquid supply. A gauge 38 and a safety valve 38*a* are in communication with the discharge from the pump, and liquid as it moves from the pump, passes through a system of piping or conduit system 39 to an injector or mixer 40.

A valve 41 may be positioned in the liquid line. Air moving from the tank 28 through the pipe system 32 and the air meter 31 reaches the mixer or injector 40 through conduit or pipe 42. The mixer 40 is connected to the pipe system 20 which, through the movable pipe system 19, is connected to the flexible pipe or tube 14. Thus liquid or gas, or a mixture of them, may be delivered to the pipe system 20 and thence conveyed into the well. A discharge or outlet means 43 is connected to the discharge side of the pump and is provided with a valve 44. Thus, if a constant capacity pump is used and it is run at constant speed, the actual liquid discharge into the system may be varied by setting the valve 44 to any desired point. Also the pressure on the liquid system can be ascertained by inspection of the gauge 38. Several valves 45 are shown in communication with the pipe 20. If desired, the jointed pipe sections 19 which comprise in effect a pantograph may be omitted, and a flexible tube may be used to connect the water supply through one of the valves 45 to the flexible tube 14 and the block or cross head 21. If desired, valves 45 might be spaced, for example, every fifty feet in the water feed line 20, and thus a relatively short link of flexible tubing could be used for joining the water supply to the pipe 14, and the jointed pipe system or pantograph would be omitted.

Figure 7:
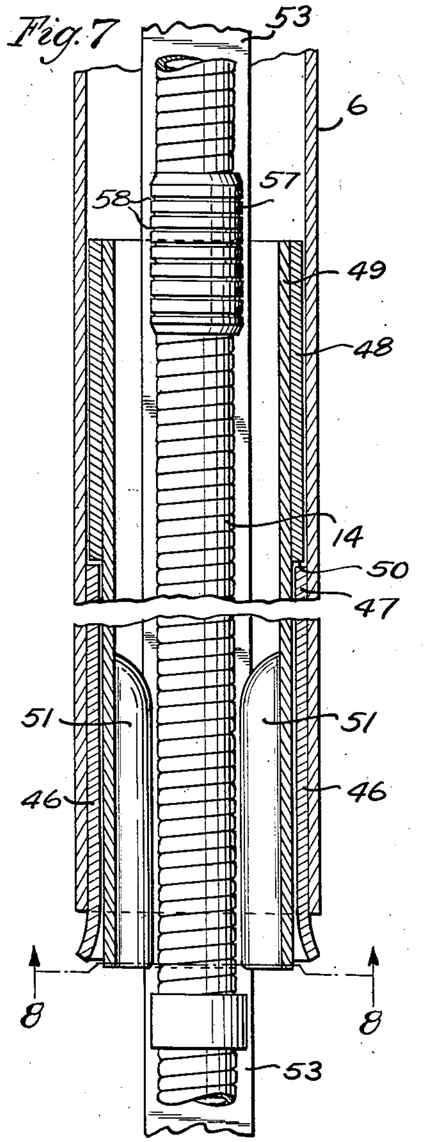
Fig. 7 is a vertical sectional view on an enlarged scale through the lower portion of the indexing pipe, showing the flexible tube member in position.
Figures 8, 9:
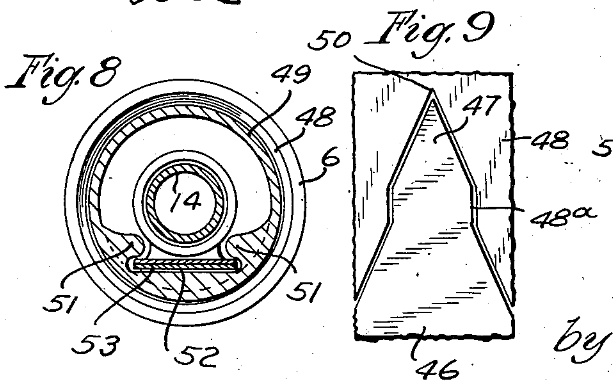
Fig. 8 is a transverse section taken at line 8—8 of Fig. 7.
Fig. 9 is a view in developed form of part of the lower end of the mechanism shown in Fig. 7.

The details of the bottom of the indexing pipe and its association with the flexible tube are shown on an enlarged scale in Figs. 7, 8 and 9. The problem here to be solved is to enable the index pipe 6, when turned, to turn the lower end of the pipe 14 while permitting the pipe 14 to freely move longitudinally and to be withdrawn from the pipe together with the terminal probing nozzle or other device. To accomplish these ends, the following arrangement of parts has been provided:

The index tube 6 is provided with a latching or positioning member 46. This member is shown in developed form in Fig. 9. As there shown, it comprises an upwardly directed point-like member 47. A mating member 48 is positioned on the outside of a relatively short tubular section 49. The member 48 is shaped with a notch or depression 50 which, as shown particularly in Fig. 9, interfits with the member 46 and its point 47. When the parts are thus interfitted, relative rotation of the tube and relative downward movement of the member 49 is prevented.

The tubular section 49 is provided with inward projections 51. As shown in Fig. 8, these sections extend toward each other and define a tracklike portion 52, within which a flexible guiding or back member 53 of the flexible pipe 14 is received. Thus with the parts engaged, as shown generally in Fig. 1, and in detail in Figs. 7 and 8, the relative rotation of the flexible pipe within the tubular member 49 is prevented. At the same time, by reason of the interfitting of the members 48 and 46, relative rotation of the tubular section 49 with respect to the index tube 6 is prevented. Correspondingly, the entire assembly, including the index tube 6, the tubular section 49 and the flexible tube 14 and its associated parts may be rotated in any desired direction and to any desired degree by merely rotating the index tube 6, and the degree of such indexing or rotation can be readily ascertained by comparing the position of the table 9 with the fixed index point $9^a$ associated with it, as shown in Fig. 2.

The member 53, which is a flat flexible band of steel or other metal, serves as a guide and support for the pipe 14 and provides in a sense a "ski runner" which supports and guides the pipe 14. This flexible member may be given an initial bend for the lower portion of its length, for example, for the lower five feet. The bend is sufficient to cause it and the pipe 14 to spring somewhat sideways and thus to tend to move toward a horizontal position when freed from the indexing tube, even without the action of the supporting post 63. The flat strip 53 is attached to the pipe 14 in substantially tangential relationship. Thus, the strip will bend with the pipe in one direction but will resist bending in a direction edgewise of the strip. Thus, the pipe and strip may bend in a more or less horizontal direction at the bottom of the well so as to follow the plane of the stratum, but owing to the resistance of the strip to bending in a transverse or edgewise direction, the pipe will maintain a radial direction as it is advanced laterally from the bottom of the well. This is important in connection with the indexing means described and enables the path which the pipe will take to be accurately controlled.

By means of the arrangement described, pipe 14 and the attached strip 53 may be removed from the well, in which case the member 48 bearing the interfitting portion 47 will be carried upwardly by reason of the fact that the pipe end will be larger than the net area of the bore. When the pipe end is replaced, the members 46, 47, 48 will be carried down into the tube 6 again and the parts will interfit as indicated in Fig. 9, thereby orienting the end of the pipe 14. A feature of the interfitting parts 46, 47, 48 is the straight sided portion $48^a$ which prevents the upper portion 48 from riding up upon the portions 46, 47, when the index tube 6 is turned.

In practice the position in azimuth of the key 46, 47 will be ascertained by methods well known in the art of well surveying, whereby the desired relation of the interfitting part 48 to the intended nozzle direction is had prior to the introduction of the probing pipe 14. In this manner, the operator is aware at all times of the direction of the tunnels which are to be made beneath the ground.

The diagrammatic showing of the conditions which prevail in the wells or bores in which the device and methods are to be used has been simplified and it is to be understood that a well of any substantial depth will not be straight. Inevitably such wells deviate from the vertical substantially and repeatedly. This well casing, the indexing tube and the flexible pipe will, therefore, not in normal conditions of operation be centered and symmetrically arranged as shown. Inevitably, they will be to some degree bent and out of center, and one member will bear on the other. The showing is, therefore, intended to be simplified in this respect.

Also, it is to be understood that the indexing tube will not be made in a single unit, but will be made of sections which are coupled together. These sections may be provided with antifriction bearings to simplify the indexing and to reduce the friction which would otherwise be present when the more or less bent indexing tube is rotated or indexed in the more or less bent well casing. It is, therefore, within the contemplation of the invention to provide means for overcoming friction both in raising and lowering the indexing tube and the flexible pipe and to overcome friction when these members are rotated or indexed.

Figure 10:
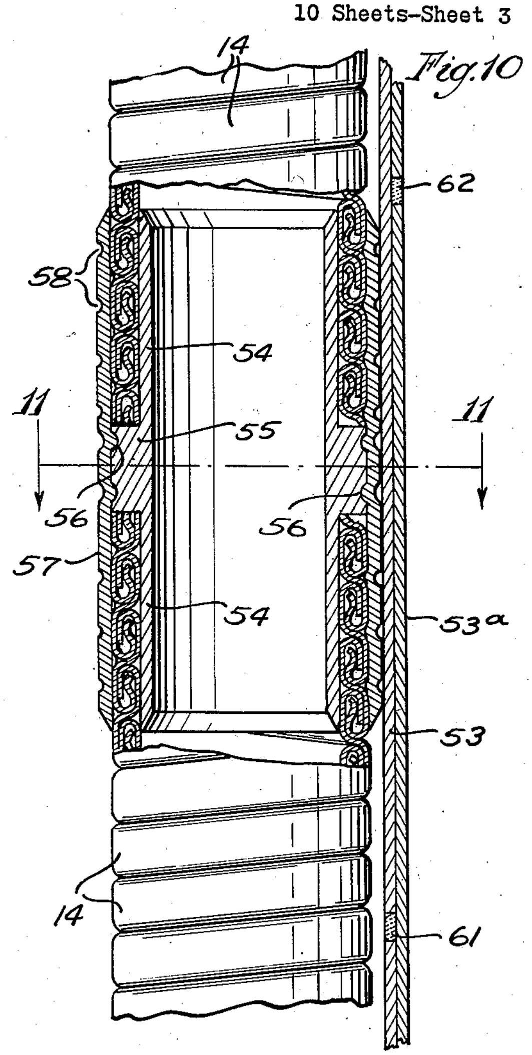
Fig. 10 is a vertical section on a further enlarged scale, showing a joint between two flexible pipe sections.

The flexible tube or probing pipe 14 is not conveniently made in one piece of sufficient length to extend to the bottom of a well. Hence, it is ordinarily made in a number of lengths and these lengths must be joined. As shown in Fig. 10, two lengths have been joined or coupled. For this purpose a nipple 54 is inserted with an end in each of two adjoining pipe sections 14. A raised external portion 55 is preferably formed centrally of and integrally with the member 54. The member 55 may be grooved externally as at 56. A sleeve 57 is positioned over the adjacent ends of the members 14 and overlies all or a portion of the nipple 54. It is compressed inwardly by the formation of grooves 58. As these grooves are formed they cause the section below them to be compressed inwardly somewhat and thus to grip the portions of the members 14, which they overlie, and to hold them tightly against the nipple 54.

Figure 11:
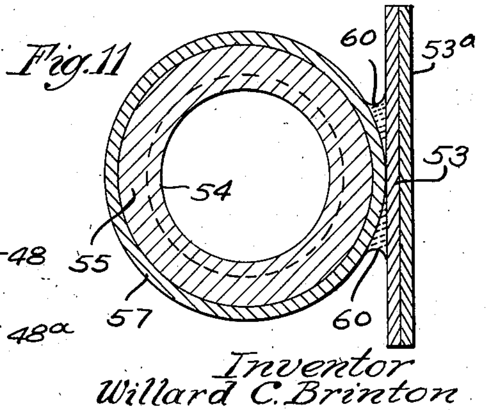
Fig. 11 is a transverse section taken at line 11—11 of Fig. 10.

The strip 53 above referred to may be of a single thickness or of several thicknesses, and the pipe 14 is fastened to it. If desired, the sleeves 57, where they are in position, may be welded as at 60 in Fig. 11 to the member 53. As shown in Figs. 10 and 11, the member 53 is formed of two thicknesses of material, 53 and $53^a$. The use of two thicknesses serves, among other purposes, to provide a means for joining lengths together. Thus, two lengths of the member 53, as shown in Fig. 10, are welded together as at 61 and two lengths of the member $53^a$ are welded together as at 62. The welds may merely join lengths of the material to each other or may, in addition, join the two member 53 and $53^a$ at spaced intervals. It will be noted that the coupling sleeves 57 transfer the weight of the pipe 14 to the strip 53 so that only one length or unit of the pipe 14 is in tension.

As shown in Figs. 1 and 2, the bore passes through strata of undesirable material until it reaches a stratum 2 of desirable material. This stratum is not of infinite depth and its lower level or surface is defined by the floor stratum 3. For some purposes it is desirable to provide a mechanical supporting and guiding means for the flexible tube or probing pipe 14 at the bottom of the well. As shown, this comprises a post 63 which is set in a depression 64 in the floor stratum 3. It may have a rounded upper end $63^a$, as shown, and may be held in place by cement or otherwise, if necessary. The upper end of the post may also be provided with a groove $63^b$ to assist in its withdrawal, if desired. As the working tool or probing nozzle is lowered with the flexible pipe 14 it will contact the member 63 and be guided out of a vertical position toward a horizontal position. In some instances, in order to facilitate the forward feed of the end of the pipe 14, the floor of the cavity may be covered with small, easily flowable discrete particles, such as marbles or rounded pebbles 63' fed down the shaft. In size they may range from about ¼" to 1" in diameter, for example.

In Fig. 1 the well has been completed, the member 63 has been set in position and operations may commence. It is to be understood throughout that the well, whether in the stratum 2 or any other stratum, may be somewhat irregular in shape and size, being subject to the variating earth conditions usually encountered in all drilling. The well is illustrated as perfectly straight, for convenience of illustration.

The condition of Fig. 1 is that which prevails when operations have been carried out for a short while. The pipe 14, with the working tool at its lower end, has been inserted and some mining operations have been carried out. As shown, the well 1 has been enlarged at its lower end by the creation of the space X.

Figures 3, 4:
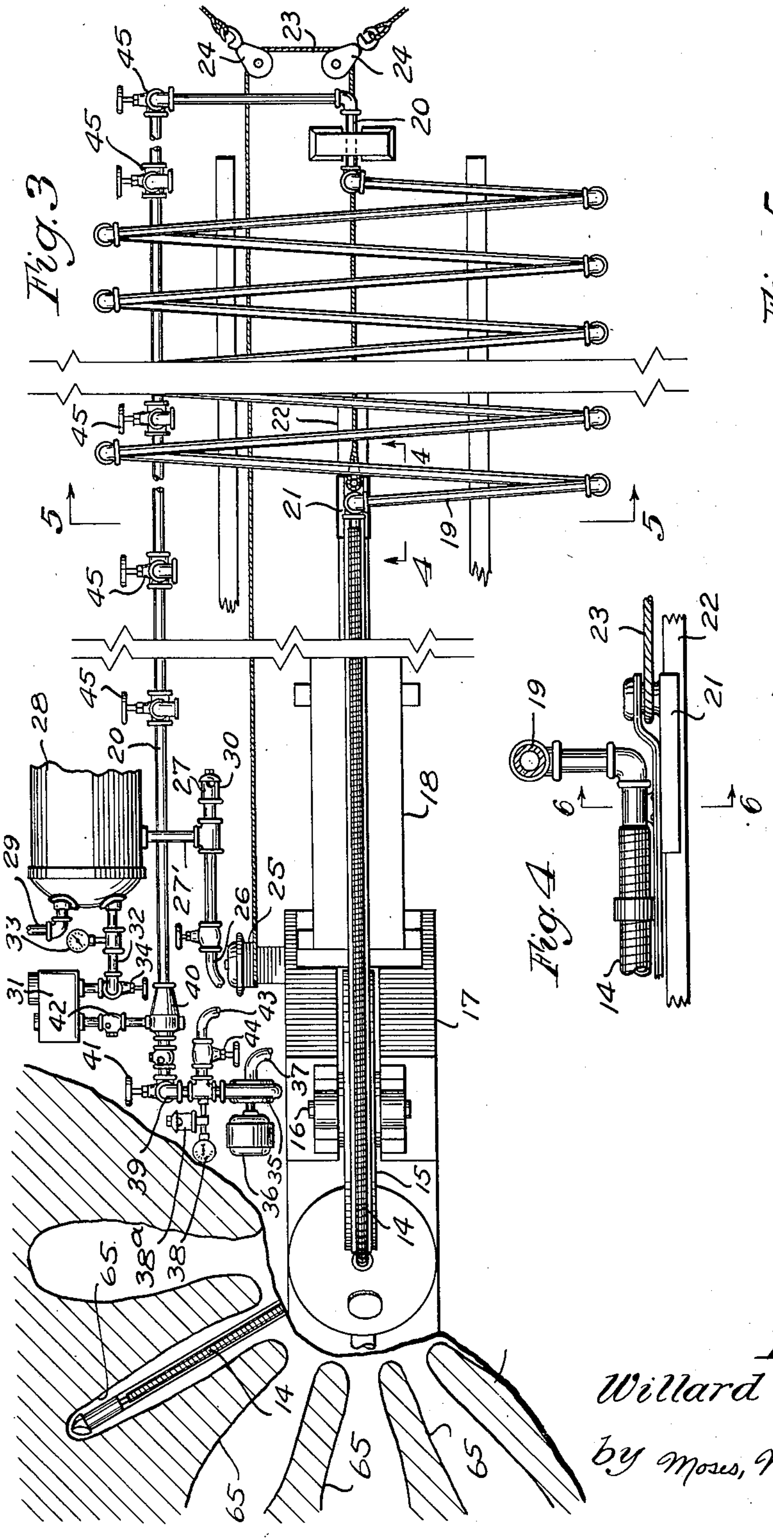
Fig. 3 is a plan view with parts in section illustrating the mechanism in Fig. 1.
Fig. 4 is a vertical section taken at line 4—4 of Fig. 3.
Figure 5:
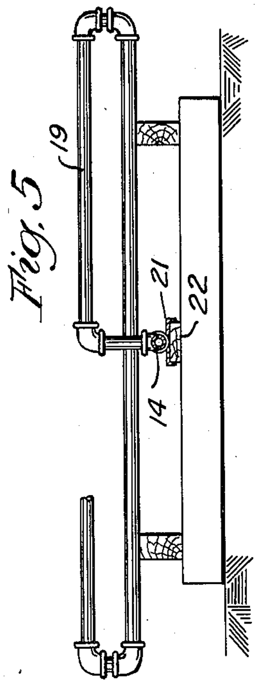
Fig. 5 is a vertical section taken at line 5—5 of Fig. 3.
Figure 6:
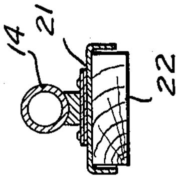
Fig. 6 is a vertical section taken at line 6—6 of Fig. 4.

As shown in elevation in Fig. 1 and in plan in Fig. 3, the probing pipe and nozzle is fed downwardly and outwardly as it removes the desirable material and thus tunnels or paths 65 are formed. The total is shown in Fig. 3 lying in one of these tunnels or paths, with others already formed. By indexing the assembly which includes the index tube 6, the member 49 and the flexible pipe 14, the probing pipe may be directed in any direction and the spaces between the tunnels 65 may be attacked and material removed. Desirably substantially the full lateral extent of the tunnel may be made while keeping the height of the tunnel substantially constant. This is accomplished by maintaining an air cover over the liquid level, as shown in various figures, the air being fed into the cavity along with the solvent liquid or separately. The liquid level will be determined by the position of the lower end of the tube 6, and when the desired lateral distance has been reached the tube 6 has been raised to a higher level as indicated by the dotted lines *a—a*, *b—b*, etc. (Fig. 1). By so proceeding, the maximum of the deposit may be removed without danger of the roof collapsing.

Figures 12, 13, 14:
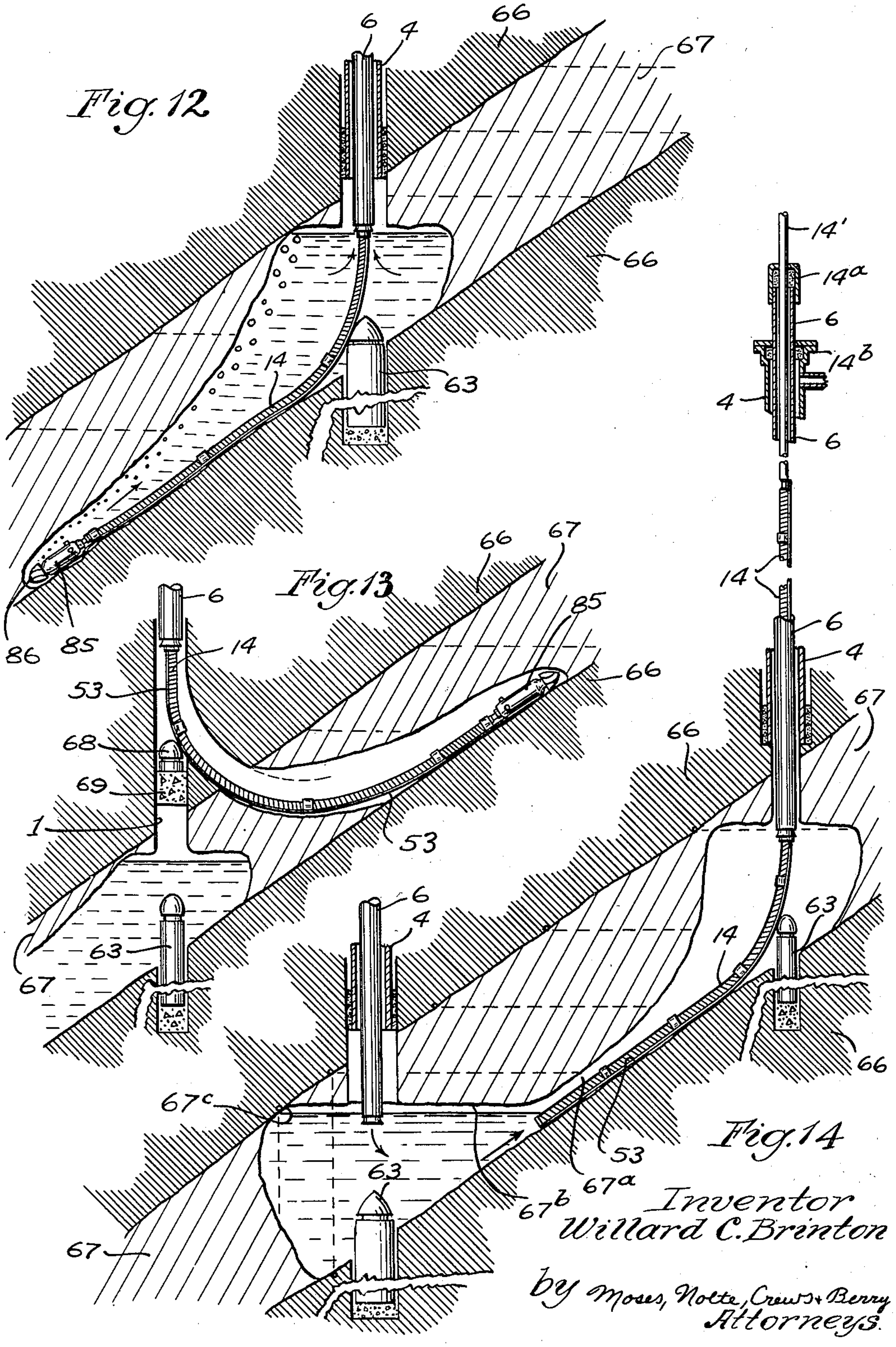
Fig. 12 is a view in vertical section similar to the lower portion of Fig. 1, but illustrating the operation in an inclined stratum when the tool is moving downwardly.
Fig. 13 illustrates the operation of Fig. 12 after the downwardly inclined portion of the stratum has been worked as far as desired and when means have been taken to cause the tool to move upwardly.
Fig. 14 is a view similar to Figs. 12 and 13, showing two wells connected to the same inclined stratum.

Figures 12 to 14, inclusive, illustrate examples of operation on an inclined stratum. Thus undesirable strata 66 lie on each side of a desirable stratum 67 and all of the strata are inclined to the horizontal. Supporting post 63 is positioned in the same manner as shown in Fig. 1 and serves the same purpose. It furnishes an initial guide for the tool to turn it from the vertical to or toward a horizontal position and also supports the pipe 14 at the bend.

As shown in Fig. 13, the lower part of the desirable stratum 67 has been worked as far as desired and the well 1 has been closed or plugged by a second support 68 held in place by concrete 69 or otherwise, and by properly indexing the movable tubular assembly, the tool and the pipe 14 have been caused to move upwardly along the desirable stratum.

As shown in Fig. 14, two wells have been used and working has taken place from each well. The workings or cuttings have joined and the flexible pipe 14 has been removed from the lower well so that circulation of liquid or liquid and gas is accomplished by introducing them at one well and withdrawing them through a flexible pipe 14 at another well.

Where a stuffing box is required, one is provided. The stuffing box appears about the indexing tube 6 at the upper end of Fig. 1. A modified arrangement of stuffing boxes occurs also at the upper right-hand portion of Fig. 14. As shown in that figure, the upper end of the flexible pipe 14 is secured to the rigid pipe 14'. Obviously where a deep well is used, it is possible to use a section of rigid pipe for communication with the flexible pipe 14. For some purposes this is desirable and although it is not shown in Fig. 1, it appears in Fig. 14. As there shown a stuffing box 14^a^ is positioned about the pipe 14' and seals the space between it and the indexing tube 6. A second stuffing box 14^b^ appears in Fig. 14 about the indexing tube 6 and seals the space between it and the fixed well casing member 4. This is substantially the same as the stuffing box shown in Fig. 1. The stuffing box construction of Fig. 14 is particularly adaptable to the arrangement shown in that figure in which two wells have been connected. The two wells are connected as shown in Fig. 14. The admission of the liquid and air mixture of the first well is continued so as to lift the at least partially saturated solvent upwardly of the pipe 14 of the second well.

The air introduced along with the solvent is removed along with the solution and its presence serves as a lift for the solution as it leaves the well. Other effects may be had, especially that of agitation, the amount of air admitted being easily regulatable by manipulation of valve 34. Furthermore, air which is dissolved in the solvent admitted is released as the solvent acquires dissolved material since its capacity for dissolving air is thereby decreased.

The method of mining, illustrated by Fig. 14, presents important advantages under certain conditions. This method is applicable both to strata which may be steeply inclined or which may be only slightly inclined from the horizontal. A preferred procedure which may be followed under such conditions is to drill two wells, one reaching the stratum at a lower level than the other, and then after an underground connection has been established between the wells, the solvent or extraction liquid is forced down into the stratum through the lower well and drawn out through the upper well. For example, the lower well may be drilled and a solvent liquid introduced and a cavity formed at the bottom of the lower well. The upper well may then be drilled and a probing pipe 14 forced down from the same into the stratum and a connecting channel 67^a^ established between the wells. The probing pipe, if one has been used, may be withdrawn from the lower well. Extraction of the values from the stratum 67 may now be carried on by passing a liquid vehicle down the tube 6 in the lower well and withdrawing it through the pipe 14 in the upper well. Air pressure is maintained in the underground workings and by means of this air pressure and by regulating the elevation of the lower end of the pipe 14, the level of the liquid in the pool may be controlled. As shown, the level of the liquid is slightly below the roof 67^b^ of the soluble stratum above the pool at the bottom of the lower well. By pulling the pipe 14 up a little way and properly regulating the amount of air in the working, the level of the liquid may be brought up so as to permit the liquid to attack the roof 67^b^ and dissolve or extract material therefrom. This procedure can be continued, gradually raising the elevation of the roof, as indicated by the horizontal dotted lines in Fig. 14. In this way, the entire deposit between the two wells may be removed or extracted. As there is no withdrawal of liquid from the pool through the lower well, caving of the roof around the lower well will not interfere with the continuous discharge of the brine or liquid bearing the values to be extracted through the upper well.

It will be seen that in a formation such as shown in which the stratum of soluble material 67 is covered by a stratum of undesired material, such as shale, the lower surface of such stratum may be attacked by the liquid when the level reaches the same, for example, at the region 67^c^. As the soluble material is gradually removed, more and more of the surface of this shale stratum may be exposed to the liquid so that if such material is of a nature to be loosened by the liquid, it may cave into the pool below the lower well. If such caving takes place to a degree where there might be crushing or flattening of the lower end of the pipe 6, such pipe can be pulled up from time to time so as to prevent injury to it. If necessary, the lower end of the casing 4 can also be raised by pulling the casing in a well-known manner. There is no danger of caving of the roof around the upper well as the liquid is kept well away therefrom by the air in the workings. There is little danger of the caving of the roof in the vicinity of the lower well affecting the end of the pipe 14, as that is located at a substantial distance from the bottom of the lower well and this distance is constantly increased as the pipe 14 is drawn up. It will be seen that if the inclination of the stratum is rather small and the wells are spaced a considerable distance apart, a very large area of the stratum can be worked from these two wells without requiring any change in the setup, except the gradual lifting of the pipe 14.

Figures 15, 16, 17:
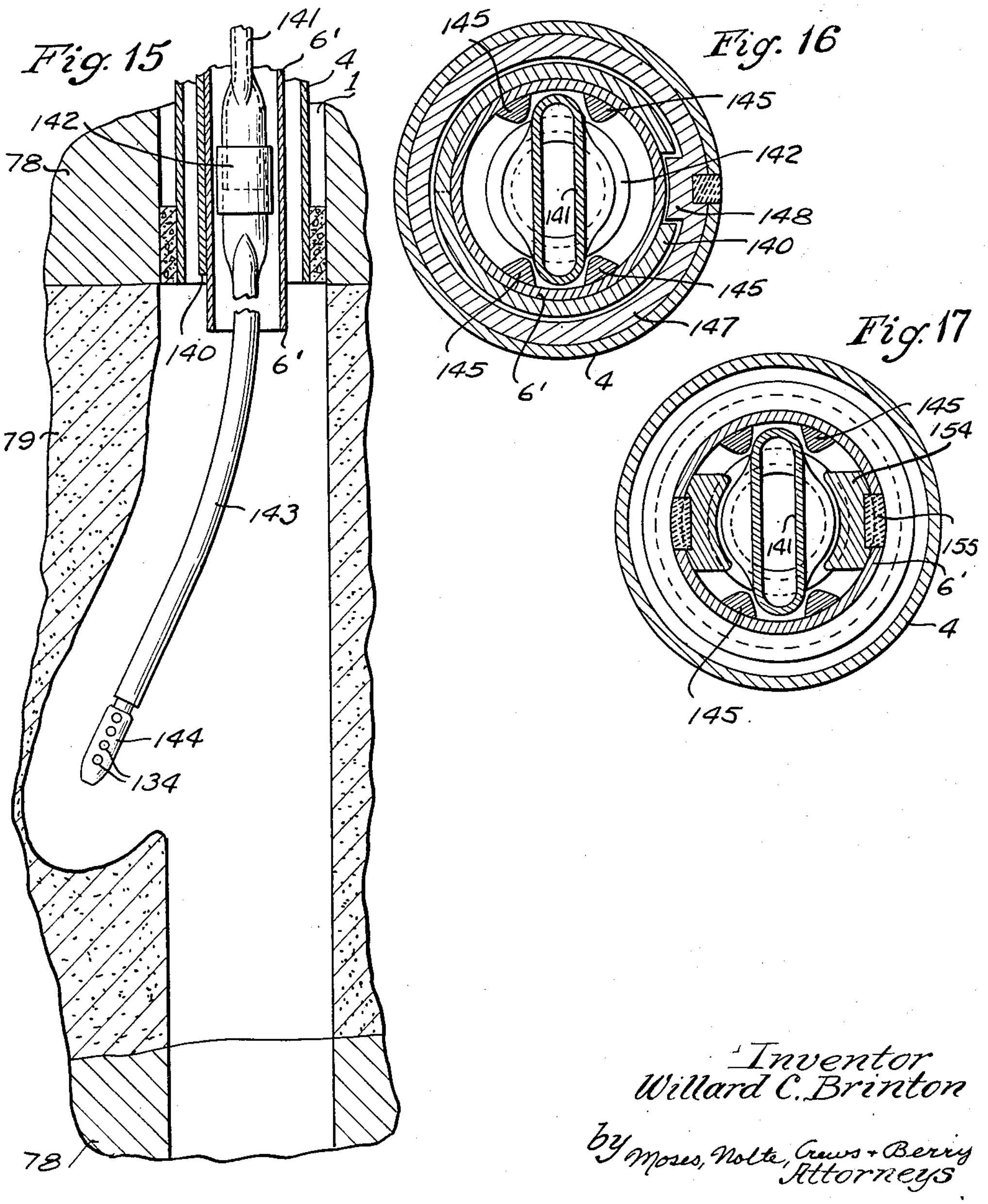
Fig. 15 is a vertical section illustrating a modified form of pipe construction.
Fig. 16 is an enlarged transverse sectional detail illustrating the pipe of Fig. 15, taken at line 33—33 of Fig. 20.
Fig. 17 is a further sectional detail taken at line 34—34 of Fig. 20.
Figure 18:
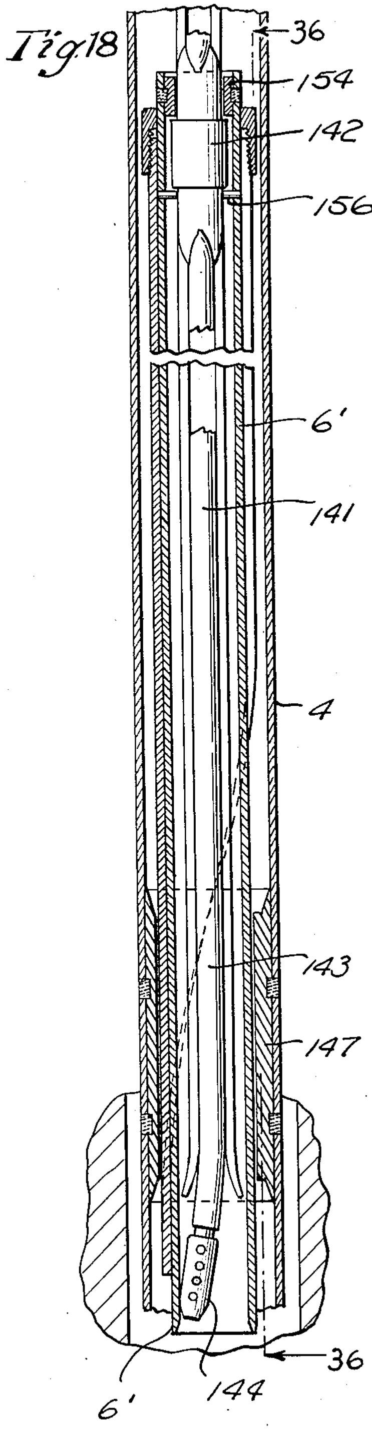
Fig. 18 is a longitudinal sectional detail illustrating the pipe construction of Fig. 15, with the nozzle and portions of the pipe withdrawn into the casing.
Figure 19:
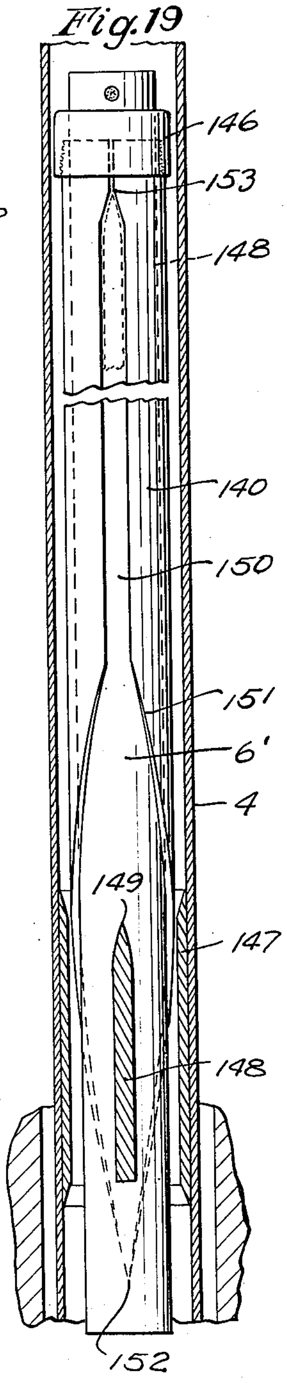
Fig. 19 is a section similar to Fig. 18, but taken on a plane at an angle of 90° at line 36—36 of Fig. 18.
Figure 20:
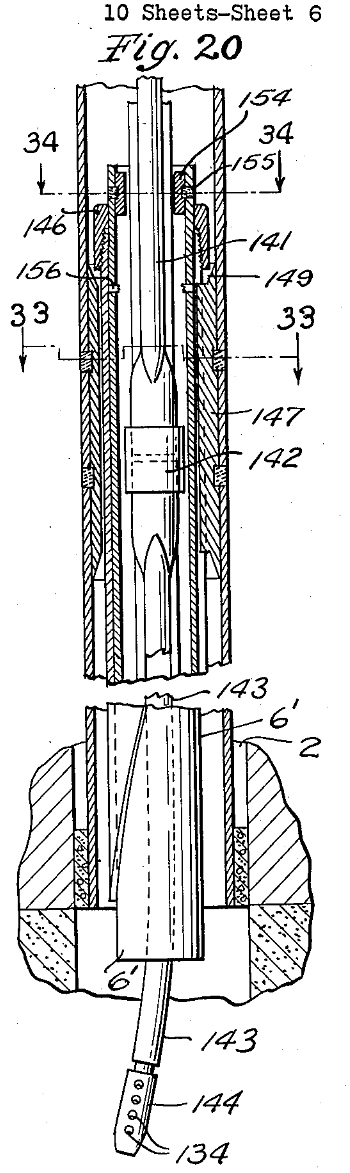
Fig. 20 is a sectional detail of the construction shown in Figs. 15, 18 and 19, with the members lowered partially from the position of Figs. 18 and 19.

In the form shown in Figs. 15 to 20, inclusive, a modified form of tool carrying mechanism and tool aligning mechanism is shown. A flattened pipe 141 is secured by a coupling 142 to a lower flattened pipe member 143 on which the nozzle 144 is mounted. The tube 143 has an initial bend so that it is biased to bend laterally away from the longitudinal axis of the casing 4. As shown in Figs. 16, 17 and 20 in particular, the pipe section 141 is guided by guide strips 145 which are welded or otherwise secured on the inside of the aligning shield 6'. They are positioned to receive and guide the flattened pipe 141 as shown particularly in Fig. 16. The cam sleeve 140 is provided with a threaded collar 146 by means of which it may be clamped upon the aligning shield 6'. Fixed within the casing 4 is a guiding and aligning tube 147 which is provided with an inwardly directed rib 148 which is pointed at its upper end, as at 149. The cam member 140 is shaped to provide a slot 150 which is flared or enlarged, as at 151, and the member 140 terminates in a point 152 which is diametrically opposite the slot 150. The slot is closed or substantially restricted, as at 153, to provide a stop for the member 148, as indicated in dotted lines in Fig. 19. As shown in Figs. 17, 18 and 20, stop blocks 154 are secured to the shield 6' by welding 155, or otherwise. Shield 6' is thus suspended upon the end portion of pipe 141. When the assembly is originally lowered, the parts occupy the position of Fig. 18 and the coupling 142 is substantially in contact with the stops 154. The parts are held in this position by one or more shear pins 156. After the pipe has been lowered to the position of Fig. 20, the shear pins are broken.

The aligning means of the forms shown in Figs. 15 to 20, inclusive, comprise the use of flattened pipes and means within the well casing 4 for guiding and orienting such flattened pipes. When the structure is to be used, the parts occupy initially the position of Fig. 18. In that position the parts are held against relative movement by the shear pins 156. The shield 6' with the flattened pipes held in fixed position within it is lowered. When the shield 6' has reached the desired lowered position of Figs. 15 and 20, its further downward movement is stopped at this point by the rib 148 which, in combination with the cam member 140 and the slot in it, guides and stops the shield 6'.

The weight of the pipe sections 141 and 143 and those above them shears the pins 156 and the pipe 143 is lowered further and protrudes increasingly from the well casing 4. Since the pipe 143 has an initial bend or bias, it springs or moves laterally out of the axial plane of the shaft, as shown in an initial stage in Fig. 20 and in a later stage in Figs. 15 and 31. Usually fluid is discharged from the nozzle 144 as it commences to emerge from the shield 6' and as the fluid is continuously discharged and the pipe 143 emerges further from the shield 6', the nozzle works its way laterally as shown particularly in Fig. 15 to enlarge the opening formed in the stratum 79, and finally to move a substantial distance out of axial alignment with the shield.

Ultimately the nozzle 144 passes to the bottom of the soluble stratum 79 and may move widely in a lateral direction. The movement of the nozzle will be generally the same as the movement of the nozzles shown in the earlier figures; for example, in Figs. 1, 12 to 14, inclusive, and elsewhere.

Figure 21:
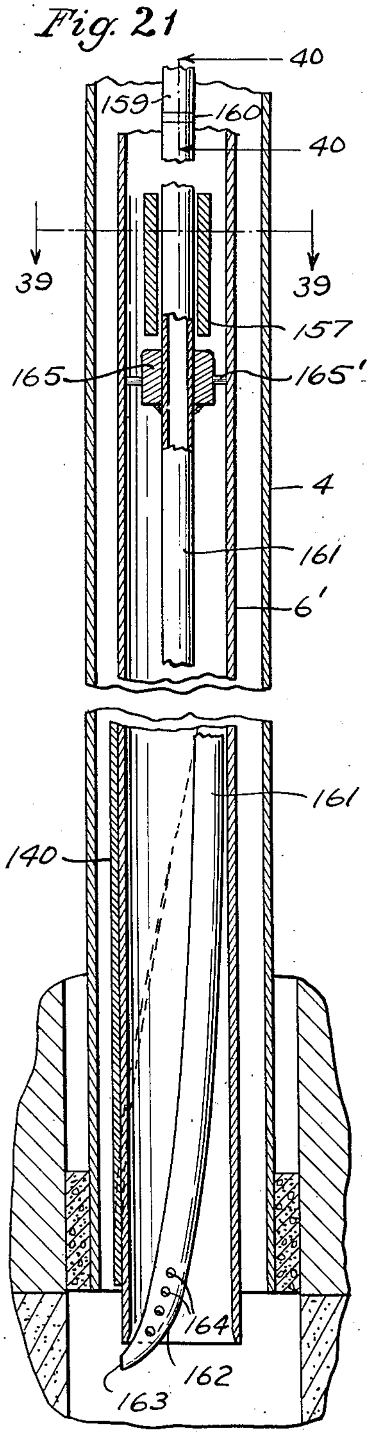
Fig. 21 is a longitudinal section illustrating a further modification, particularly of the means for joining the pipe sections.
Figure 22:
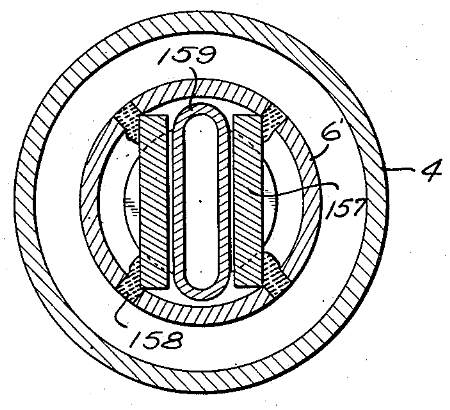
Fig. 22 is a transverse section taken on an enlarged scale at line 39—39 of Fig. 21, illustrating the guiding means.
Figure 23:
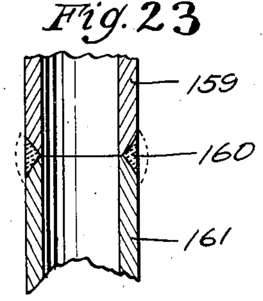
Fig. 23 is a longitudinal sectional detail illustrating the welding means for joining pipe sections, taken at line 40—40 of Fig. 21.

In the modified form shown in Figs. 21 to 23, inclusive, the construction of the casing 4 and the shield 6' and the cam member 140 is as described above. Changes have, however, been made in the pipes which carry the nozzle and in the aligning or guiding means. For this purpose, guiding plates 157 are secured by welding 158, or otherwise, to the interior of the shield 6'. In this form of the device, continuous flattened pipe sections 159 are used, at least for the portion destined for lateral extension, and thus the upper pipe section 159 is welded, as at 160, to a lower section 161. The lower section 161 is itself shaped to provide a nozzle portion 162 which may be provided with a forward opening 163 and other or lateral openings 164. Welded or otherwise fixed to the pipe section 161 is a stop 165. When the shield 6' is to be raised or lowered, it is positioned and supported by the contact of the stop 165 with the guide members 157. To keep the shield 6' from moving on its support on the flattened pipe section while being lowered into the well, shear pins 165' are preferably provided to temporarily anchor the shield to the pipe section 161 by connecting the shield with the stop 165. Such pins also allow the pipe to be pushed into the well. When shield 6' is brought into position at the bottom of the well casing 4, the weight of the column of pipe is easily sufficient to break the pins.

It will be understood that the probing pipe may be entirely of flexible or flattened or elliptical sections or the vertical part of the pipe may be of standard pipe sections, only enough flattened or flexible sections being used at the lower end to provide for the lateral probing action. It will also be understood that the weight of the vertical column of pipe which is suspended in the well by suitable raising and lowering means, as well known in the drilling art, provides the necessary force for pushing out the laterally extending probing end of the pipe. This applies to the flattened or elliptical pipe, as well as to the commercial flexible pipe of the form shown in Figure 1.

The use and operation of this invention insofar as the same have not heretofore been fully explained are as follows:

In general, the method and apparatus shown herewith combine in their use the steps of forming a drill hole, positioning a fixed casing in it, and positioning in it an indexing pipe or shield in combination with a flexible tool carrying tube. With these parts in place, the rotatable assembly is rotated to the desired position, the flexible tool carrying tube is lowered until the tube is at or near the bottom of the desired stratum, and a liquid or a mixture of liquid is pumped through the flexible tube. Material which is being recovered then passes upwardly between the rotatable tube and the index pipe or casing and is discharged into a suitable tank.

Considering the arrangement shown in Fig. 1 with the parts in the position which they occupy in that figure, water or other active liquid is pumped downwardly through the flexible pipe 14, is discharged through the tool 85 and operates the cutting members 86. At the same time air, gas or any light inert fluid is pumped downwardly through the pipe system 20 (Fig. 3) and flows downwardly through pipe 14, and being lighter than the active liquid fills the upper portion of the cavity produced by the mining. The volume and pressure of this fluid determines the degree to which the level of water within the working is raised or lowered. The liquid or solution passes upwardly between the indexing tube 6 and the pipe 14 within it. Fig. 8 indicates a substantial clearance between these members even at the lower end of the tube 6 where the guiding members 51, 52 are positioned. The liquid raised from the well flows outwardly at the top of the indexing tube 6, thence into the chamber 10ᵃ through the pipe 10ᵇ, shown in Fig. 1, and into the tank 13. The annular space between the tube 6 and the casing 4 affords insulating means of great utility. Fig. 1 shows an accumulation of light oil 12ᵃ between the wall 12 and the septum 13ᶜ and an opening 13ᵃ for the exit of the subnatant aqueous layer 13ᵇ. Where such a light oil is used as a filler, or inert protective medium, if it is present in sufficient quantities, it will appear at the location 12ᵃ. If the supply in the well has become depleted, so that none of it is forced up with the solution, checking at this location will show that fact and additional oil may be supplied.

In general, the freeing and removal of material from a well follows the steps above described. For some purposes water alone is sufficient to form a solution which then is carried to the surface. For other purposes and for other materials the water must be heated. Similarly, many different materials may be used for maintaining the level of liquid within the working space. Air alone may suffice. Liquids such as kerosene and various other hydrocarbons may be used. These liquids should be such that they do not mix freely or form a solution with the product which is being recovered. Of importance is the action of the solvent to release oil from subterranean oil-sand deposits whereby the sand is left below ground.

In all of the variations of the method it is ordinarily preferable to remove the desirable material first, by dissolving or otherwise, from the lower portion of the stratum in which it appears. In the case of some materials, particularly where a solution is formed, it is sufficient to dissolve the material upwardly by controlling the operation by the liquid jet and by controlling the level of liquid within the stratum by raising the tube 6. This action is had by use of the jacks 8 of Fig. 1, the tube 6 after raising being cut off to the level as shown in Fig. 1.

As the desirable stratum is removed, the level of liquid may be allowed to rise. In the case of oil and other materials which are not truly dissolved from their stratum, but are removed by hot water or otherwise, it may be necessary to raise the level of the working by introducing material such as concrete. Sometimes also it is desirable to put down concrete, asphalt or other material where the undesirable stratum below the desired stratum is water soluble or water pervious or is of such nature that it may be removed by the water or other fluid which is introduced into the well. Where this is the case a thin layer of the protecting material will suffice.

The use of air or gas intermingled with the water which is forced out of the tool has been referred to. This may be supplied continuously or omitted entirely, or it may be supplied in charges. Thus, in effect a charge of compressed air or other gas may be shot at intervals through the flexible tube and this has the mechanical effect of stirring up the material within the well. It may have an almost explosive effect, if the gas is introduced at sufficient pressure. The air meter 31, shown in Fig. 3, may include a timing device for giving different air or gas charges at regular intervals. Sometimes the air pressure within the flexible pipe 14 assists the pipe to float somewhat, for example in brine. Because of this buoyancy and because of the fluctuation of the air or gas charges, the pipe itself may "jump" and thus tend to lessen the friction of it upon the floor of the cavity.

The method is not dependent on the details of the apparatus but may be somewhat varied by using different apparatus.

Air, oil or other similar material is floated on the top of the liquid mass within the well. This may be an oil which will not mix with that which is being extracted from the stratum. Sometimes where a very heavy oil is being extracted it may be necessary or useful to dilute it in the well with a lighter oil to assist in extraction and raising to the surface of the ground. Caustics and detergents may also be used in connection with the oil removal from the stratum in which it is found.

Figures 26, 33:
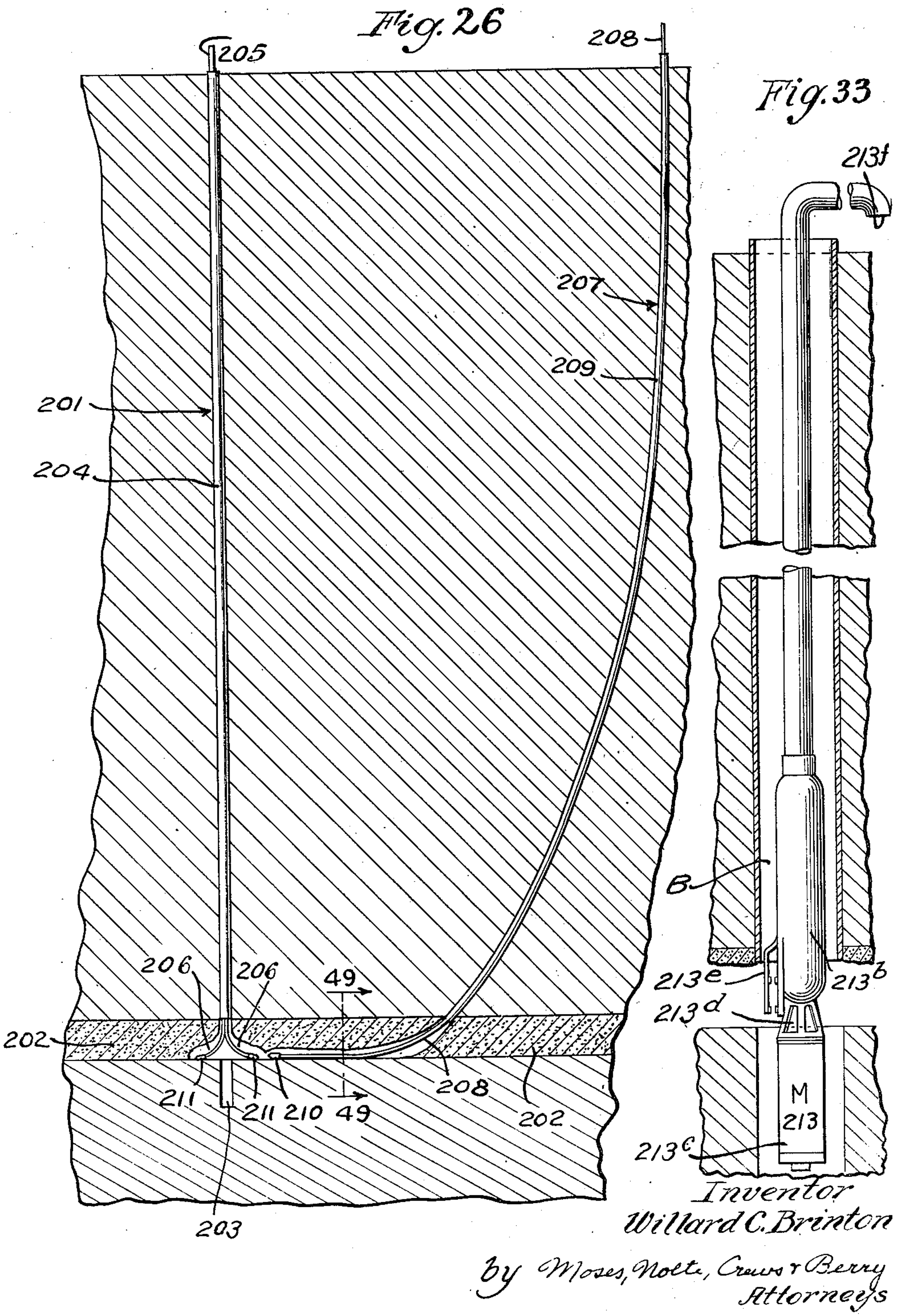
Fig. 26 is a vertical section on an enlarged scale showing one stage of the operation.
Fig. 33 is a vertical section showing the operation of a submerged pump in the vertical hole.

The embodiment of the invention as illustrated in Figs. 24 to 33 will now be described. As already mentioned, this method is particularly applicable to removal of materials occurring in comparatively thin strata, and more especially materials soluble in water or aqueous solutions, such as sodium sesquicarbonate (also known as trona), sodium chloride, etc. Referring to Fig. 26, a vertical well 201 is drilled until the soluble stratum 202 has been penetrated, the end of the drill hole being shown at 203. The hole is preferably provided with the usual casing 204 in a manner well known in the art. The stratum having been located, the cavity formed therein may be enlarged by the use of solvent introduced through a pipe 205 having branches 206, 206 in accordance with any of the methods disclosed herein. The solution formed is removed upwardly through the annular space between the pipe 205 and casing 204.

The stratum having been located by means of the well 201, a second well 207 is commenced at a suitable distance therefrom. By the use of known directional drilling methods, the second drill hole 207 is inclined or curved so that it will intersect the stratum 202 at an angle enabling the introduced pipe 208 to make the bend in the stratum without kinking or straining the metal unduly. A casing 209 is provided which may reach to the soluble stratum. The end of pipe 208 may be advanced by a probing action beyond the end of the casing 209 and caused to reach the cavity surrounding the end of the pipe 206 and to thereby establish communication between the two holes. Pipe 208 is suitably provided with nozzle 210. Nozzles 211 of suitable type may be provided for pipes 206, 206. Soluble material is removed as already described in the case of pipe 205. When communication between the two wells has been established, the flexible pipes 208 and 205 may be withdrawn and solution introduced through casing 209 and removed through the casing 204. The advantage of the inclined drill hole 207 will now be apparent. When communication is established between the inclined hole 207 and the vertical hole 201, it will be seen that the casing 209 for the inclined hole allows the pipe 208 to be moved forward in the direction roughly determined by the line connecting the holes 207 and 201 at the surface and to continue for an indefinite distance beyond it.

Figure 24:
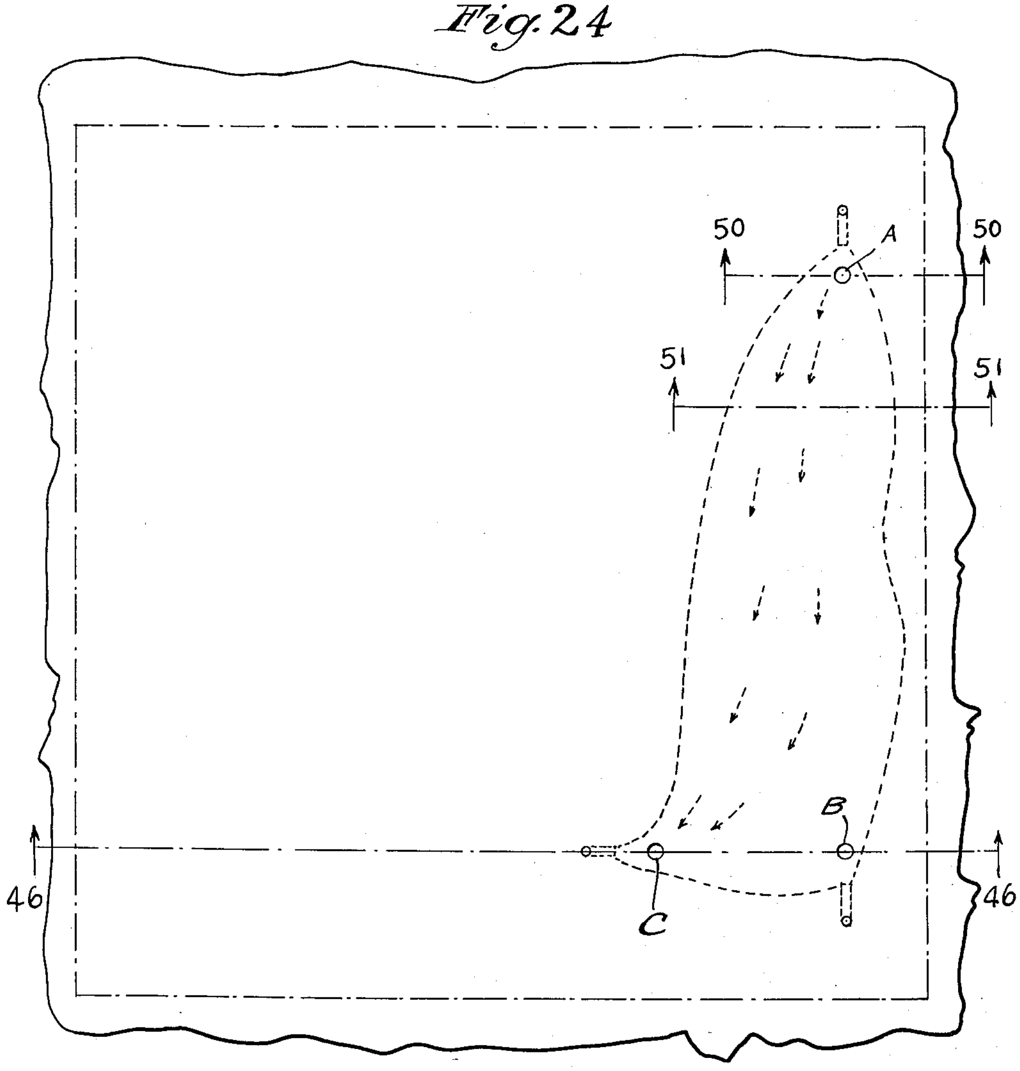
Fig. 24 is a plan view with diagrammatic illustration of the operation of a modified method.
Figure 25:
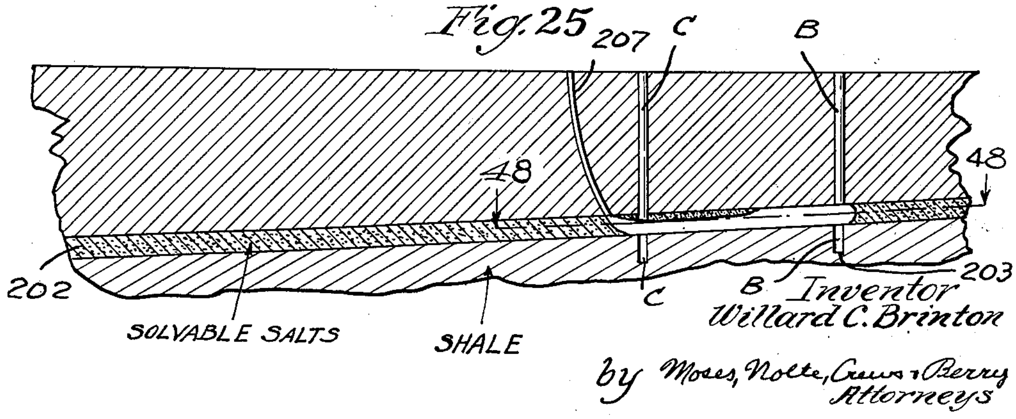
Fig. 25 is a vertical section taken on line 46—46 of Fig. 1.
Figure 27:
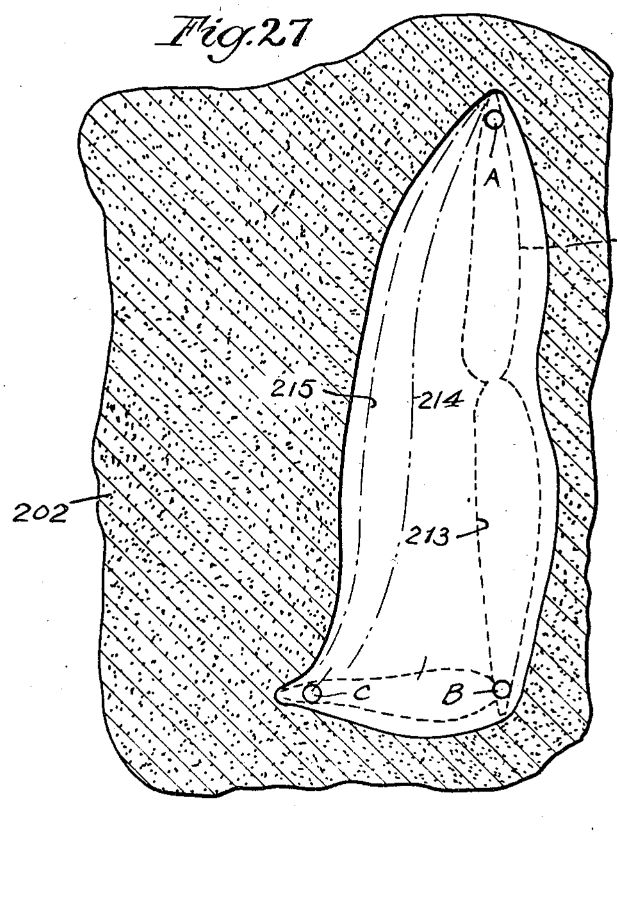
Fig. 27 is a horizontal section taken on line 48—48 of Fig. 25.

Figures 24 and 27 illustrate an improved method of removing solubles from a comparatively thin stratum by utilizing this advantage of the inclined drill holes. In these figures, the stratum is represented to slope from the top toward the bottom of the figure, and from the right to the left thereof. In so proceeding, the region A at the top is first drilled, preferably using the combination of the straight and inclined drill holes as shown. Then, the region B downslope from region A is drilled, preferably using the same combination of vertical and inclined holes as illustrated. By methods already described, communication is established between region A and region B through the soluble stratum, enlargement of region A taking place in the direction shown by the dotted lines 212 while region B is similarly enlarged in the direction of region A, as shown by dotted line 213, such action taking place until the cavities formed unite.

It is a feature of my invention that at this point the operation of feeding solvent and removing solution by balancing the pressures of the two columns of liquid may be discontinued and the hydrostatic pressure on the liquid in the two cavities now united may be released. Thereby, the further flow from point A to point B, for example, will be by gravity, and of whatever volume desired. (Note that if the liquid were under hydrostatic pressure, it would of necessity fill the cavity except for the layer of compressed air between the level of the liquid and the roof.) Discontinuance of the hydrostatic pressure condition has the further advantage that should a break occur in the roof, the liquid will no longer be forced into the new cavity formed. A still further advantage is that by employing restricted quantities of liquid flowing through the underground channels, the temperature of such liquid may be relatively easily controlled, whereby that temperature may be maintained which within limits will give the liquid the most dissolving power.

When hydrostatic pressure on the liquid within the cavity is to be released, the solution is removed as by means of a pump 213$^b$, Fig. 33, in well B, for example, any suitable type of deep well pump may be utilized which may be driven by mechanical means, such as a sucker rod (not shown) or by electrical or other power. In the construction shown, the pump is driven by an electric motor 213$^c$, the liquid being drawn in through the inlet opening 213$^d$. Suitable controls, such as a series of contacts indicated diagrammatically at 213$^e$, is provided, such that when the liquid is drawn down to the level of the lower set of contacts, the motor will be stopped. This will prevent racing when there is not sufficient liquid for the pump to handle. When the liquid level rises above this minimum to the upper set of contacts, the motor will be started and continue to operate the pump so long as the desired level is maintained.

By maintaining the conditions described, the amount of liquid passed through the workings may be regulated and only a measured amount of liquid introduced, if desired. The level of the liquid in the underground passages may also be controlled. Also, the temperature of the liquid may be readily controlled. By regulating the rate of flow and the temperature with respect to the distance between the inlet and exit wells, the degree of saturation of the liquid when it reaches the exit well and in the vicinity of the pump in such well, may be controlled. The degree of saturation may be measured, for instance, at the discharge of the liquid from the pump at 213f. (Fig. 33.) Obviously, the fresh liquid near the inlet well will be most active and by permitting the liquid to become fully saturated before the exit well is reached and by properly regulating the level of the liquid adjacent thereto, the dissolving of the soluble deposit under the roof of the working in the vicinity of the pump can be kept to a minimum. Thus, danger of caving of the roof, particularly of the shale or other material overlying the soluble stratum, can be avoided. The pump can therefore be kept in operation without interference from caving while large amounts of the soluble material are removed at points remote from the pump.

Figures 28, 29, 30:
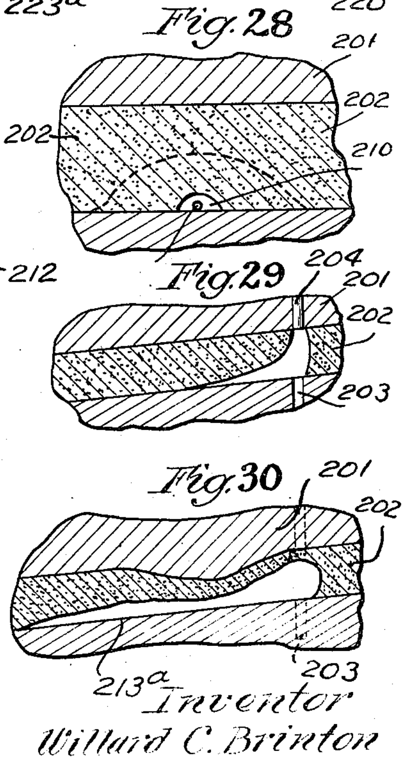
Fig. 28 is a vertical section taken on line 49—49 of Fig. 26.
Fig. 29 is a vertical section taken on line 50—50 of Fig. 24.
Fig. 30 is a vertical section taken on line 51—51 of Fig. 24.

Figures 28, 29 and 30 show how the free flowing solvent tends to dissolve out soluble material when the floor of the cavity 213a slopes to the left, as shown, thereby having the tendency to uncover more and more of such floor by following such downward slope.

Communication having been established between wells A and B, well C is drilled, such region being selected where the stratum therebeneath is lower than at points A and B, such regions C, B and A forming a triangle as seen in Figs. 24 and 27. Communication is then established through the stratum between the points B and C. Solvent is then introduced through the pipe at A and removed from region C, preferably by means of pump 213b, now placed in well C. In this manner, the entire cavity is enlarged by the action of the solvent introduced at A and flowing by gravity to region C. The dot and dash lines 214, 215 (Fig. 27) show the progressive enlargement of the cavity. The action shown cross-sectionally in Figs. 28, 29 and 30 already mentioned is accentuated upon removing the solution from well C.

One advantage of my improved method is that should cave-ins occur, they effect no construction of the pipe, since none is there, and their chief effect is that material of the soluble stratum is loosened and broken up and is the more readily dissolved. Having formed a cavity, as shown in Fig. 27, the process may then be repeated as desired and as permitted by the extent of the stratum. Fig. 30 shows a sloping roof formed prior to such a cave-in.

In mining by means of communicating vertical and inclined wells, as described in connection with Figs. 24 to 27, the driving of the vertical well has usually been referred to as the first step. It is not necessary, however, in all cases to drive the vertical wells first and in some instances the vertical well may be omitted altogether. For example, the inclined well may be put down first and the position reached by its lower end determined by known well surveying methods. The vertical well or a second inclined well may then be drilled, directed in such a way as to meet the bottom of the first inclined well. Where a considerable cavity has been formed at the bottom of the first well or pair of wells, it is often possible to effect a communication with such cavities by the use of an inclined well alone. For example, in the situation illustrated by the diagrams 24 and 26, if wells had been drilled at regions A and B and brought into connection, an inclined well only would probably be needed in region C, in order to connect with the channel already established between regions A and B.

Figures 31, 32:
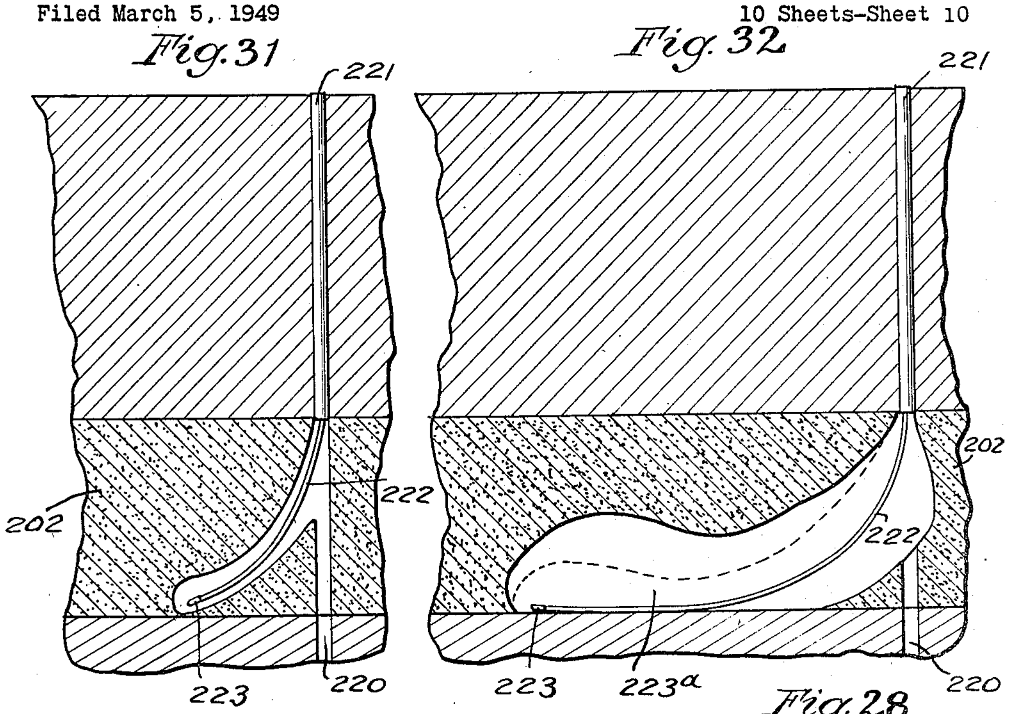
Fig. 31 is a vertical section showing one stage of the method applied to a relatively thick stratum.
Fig. 32 is a generally vertical section showing another stage of the operation of the same stratum.

In Fig. 31, the action is shown of an elastic pipe having an initial set as already described and illustrated in Fig. 15. Thus, drill hole 220 having been made and casing 221 having been placed therein, a pipe 222, the end of which has been given an initial set to spring outward, is inserted. Upon emerging from the casing the end of the pipe which has been restrained while within the casing is free to bend and thus acquires a lateral direction as shown. This method is applicable to strata of somewhat greater thickness than illustrated in Figs. 24 and 25, for example.

Fig. 32 shows the action of the pipe 222 after it has reached the floor of the cavity, as for example the shale or other rock constituting same, and the action of the solvent which is introduced through the pipe 222 and nozzle 223, and is removed upwardly through the casing outside pipe 222, this action continuing as indicated by the cavity there shown. By thus always feeding the solvent at a point remote from the well and adjacent the receding wall of the cavity, the effect is had that the fresh solvent starts its greatest dissolving action immediately upon its discharge, thus producing a cavity having a substantial height 223a.

In the foregoing specification where reference is made to a "probing nozzle," this may be either a separate nozzle formation attached to a pipe (Figs. 1, 18, 20) or it may be the pipe end itself so shaped as to discharge a liquid under pressure at the end of the pipe, as, for instance, by providing the end portion of the pipe with lateral perforations (Fig. 21).

Where reference is made in the specification to an "abutment contacted by the end of a probing pipe," this may be a post as shown in connection with Figures 1, 12, 13 and 14, or it may be an underlying resistant stratum as illustrated in Figures 24, 25, 26 and 32.

While I have described in detail certain preferred methods which I have found to be most desirable and efficient in practicing my invention, and while I have illustrated and described in detail certain forms of apparatus which I have found well adapted to carry out the required operations, I do not wish to be understood as limiting myself to the performance of the process in the precise manner set forth or the following of a particular sequence of operations where this is not essential to secure the intended result, or to the use of the particular apparatus as set forth in the specification, as I realize that changes both in procedure and in the apparatus are possible; and I further intend each step or sequence of steps and each element or instrumentality appearing in any of the following claims to be understood to refer to all equivalent steps, sequences of steps, elements or instrumentalities for accomplishing substantially the same result in substantially the same or equivalent manner.

I claim:

1. In the art of removing material from deposits thereof below the surface of the earth, which material is capable of being removed by and carried in a liquid vehicle, the method which consists in drilling a well into the deposit, passing therethrough a pipe which is relatively non-flexible in one plane but is relatively freely bendable in a plane at right angles thereto, the end of said pipe being advanced until its bottom contacts an abutment and is thereby deflected, causing the pipe to bend in the direction of its lesser bending resistance, passing a liquid therethrough, withdrawing the same laden with material from said deposit, and then continuing to advance the end of said pipe laterally of the well axis as said material is removed, utilizing the relatively nonflexible characteristic of the pipe in the plane at right angles to the direction of bend of the pipe to maintain the direction of advance of the pipe laterally of the well axis the diameters of said well and pipe being so related in size that the walls of the well hold the pipe from bending beyond its elastic limit while passing through the well.

2. In the art of subterranean mining of strata containing values which may be removed by the action of a liquid vehicle or solvent, the steps which consist in drilling a well into a stratum to be mined introducing a casing into the well as it is being drilled, passing a bendable probing pipe down said well through said casing, the inner diameter of said casing being sufficiently close in size to the diameter of the probing pipe to hold the probing pipe against bending beyond its elastic limit while passing through the well the end of said probing pipe being advanced until its bottom contacts an abutment, causing the lower end of said probing pipe to be laterally diverted below the lower end of said casing, forcing liquid under presure through said pipe so as to form a channel in the stratum to be mined, forcibly advancing the pipe so as to cause the laterally diverted end thereof to advance through the channel in the stratum, and maintaining a rate of advance of the probing pipe such that the channel is not enlarged by the flow of the liquid during the advance of the pipe beyond a size where support sufficient to prevent buckling of the pipe is afforded by engagement between the walls of the channel and the advancing pipe.

3. In the art of subterranean mining of strata containing values which may be removed by the action of a liquid vehicle or solvent, the steps which consist in drilling a well into a stratum to be mined, passing a bendable probing pipe down said well and advancing the same until its bottom contacts an abutment and is deflected laterally beyond the point where said well enters said stratum while forcing liquid under pressure through said probing pipe, maintaining the rate of lateral advance of said probing pipe through the stratum at such a value as to prevent enlargement of the passage formed by the probing pipe to an extent greater than that required to permit advance until the probing pipe has been advanced laterally to substantially the maximum distance desired from the bottom of the well, and continuing the flow of liquid down said probing pipe whereby the material can be removed from the deposit near the end of the probing pipe at a greater rate than near the bottom of the well and an enlarged cavity will be formed near the point of maximum advancement of the probing pipe while the formation of an enlarged cavity adjacent to the bottom of the well is delayed.

4. In the art of subterranean mining of strata containing values which may be removed by the action of a liquid vehicle or solvent which strata overlie a floor stratum of more resistant material, the steps which consist in drilling a well deep enough to reach the stratum containing the values to be removed, passing a bendable probing pipe down said well until it engages the resistant floor under the stratum to be mined, continuing the advance of the probing pipe so as to cause the end thereof to be laterally diverted, forcibly advancing the pipe so as to cause the laterally diverted end thereof to slide outwardly along the surface of the underlying floor stratum, and forcing liquid under pressure out through said pipe so as to form a channel through the lower part of the stratum to be mined immediately above the surface of the floor stratum.

5. In the art of removing material from deposits thereof below the surface of the earth, which material is capable of being removed by and carried in a liquid vehicle, the method which consists in passing a stream of said liquid through a well reaching into the deposit and causing the stream of liquid to impinge against a wall of the formed cavity in the deposit, moving the point of discharge of said stream toward said wall as the same recedes to maintain impingement upon said wall, and introducing air intermittently into said stream of liquid so that the same will be released in bursts at the point of discharge of said stream adjacent to the wall so as to produce agitation adjacent to the point of impingement of the liquid.

6. In the art of mining material from deposits below the surface of the earth, which material is capable of being removed and carried in a liquid vehicle, the method which consists in sinking a drilled well to reach into the deposit, passing a flattened pipe therethrough until its bottom contacts an abutment and is thereby caused to bend in the direction of the shorter axis of the flattened pipe section, laterally into the deposit below the point where the drilled well enters the deposit to assume a direction deviating laterally from the well axis, passing said liquid through said pipe and withdrawing the same laden with said material from said well.

7. In the art of mining material from a deposit below the surface of the earth, which material is capable of being removed through a drilled well reaching said deposit, the steps which include locating a probing pipe guiding element near the bottom of the well, adjusting said probing pipe guiding element in azimuth, making a determination at the bottom of said well by means of known well surveying methods of said adjustment in azimuth, and passing down said well a flattened probing pipe easily bendable in a direction transverse to the longer cross-sectional axis and difficultly bendable in a direction transverse to its shorter cross-sectional axis, the pipe being pre-bent for lateral extension in the direction of its lesser bending resistance, and positioning said probing pipe in said well so that bending in the direction transverse to its longer cross-sectional axis will take place in the predetermined direction in azimuth.

8. The method of dissolving and removing material from a subterranean stratum which has a downward inclination, which method comprises the following steps: drilling a first well, thereby locating the stratum, drilling a second well downslope of the stratum from the first well and establishing communication between said wells by passing a liquid into said wells and withdrawing solution therefrom, drilling an additional well or wells to a point in said stratum where the same is lower than at the points where the first and second wells are drilled, such additional well or wells being at a substantial distance from the line joining said first and second wells, establishing communication through said stratum between the second and additional wells, and then establishing a flow of liquid by gravity which is introduced through the first well, and the resulting solution withdrawn through said additional well or wells.

9. The method of mining a subterranean stratum from which values are to be extracted, said stratum overlying a floor stratum of more resistant material, which comprises first drilling a generally vertical well to determine the location of the stratum to be mined, introducing a liquid into the well to enlarge the cavity at the bottom thereof, drilling an inclined well commencing at a point on the surface of the earth a substantial distance from the start of said first well, directing the drilling of said second well towards the cavity at the lower end of the first well, passing a probing pipe down said second well beyond the lower end of said second well and advancing the same into said cavity, the inclination of said second well enabling the pipe to extend without excessive bending along the floor of said stratum, introducing a liquid vehicle down said pipe, and removing the liquid vehicle with values carried thereby through said first well.

10. The method of mining a subterranean stratum from which values are to be extracted which comprises drilling a pair of spaced wells into the stratum, at least one of said wells being inclined so that the wells are closer together at the bottom than at the top, passing a probing pipe down an inclined well, forcing liquid down said probing pipe, and advancing said probing pipe in a lateral direction beyond the bottom of the drilled inclined well until communication is established through said stratum from one well to the other.

11. The method of dissolving and removing soluble material from a stratum beneath the surface of the earth, which method comprises the following steps: drilling an initial generally vertical well and thereby locating the soluble stratum, drilling an inclined well commencing at a point on the surface of the earth a substantial distance from the start of said first well, said second well having an inclined direction toward the lower end of said first well, and continuing said second inclined well until it reaches said soluble stratum, passing a probing pipe through said second well, the inclination of which enables said pipe to extend beyond the bottom of said well without excessive bending along the floor of said stratum as said soluble material is removed, passing said pipe in a guided direction toward said first well until connection is established between said wells, and removing said soluble material by supplying a solvent through said pipe and withdrawing solution from the stratum.

12. The method of mining subterranean soluble deposits which consists in drilling a plurality of spaced wells to reach the deposit, establishing a channel through the deposit connecting the bottoms of said wells, introducing a measured amount of solvent liquid into one of said wells and causing it to flow through said channel and pumping the same out of the other well, regulating the amount of liquid so that the wells are not filled and no substantial hydrostatic pressure is maintained, and controlling the temperature and rate of flow of the solvent, so as to produce saturation of the liquid before it reaches the region adjacent to the exit well, whereby caving of the roof to an extent which would interfere with the flow of liquid out of the exit well is avoided.

13. In the art of mining material from a deposit below the surface of the earth, which material is capable of being removed through a drilled well reaching said deposit, the steps which include passing down said well a flattened probing pipe easily bendable in a direction transverse to the longer cross-sectional axis and difficultly bendable in a direction transverse to its shorter cross-sectional axis, the pipe being pre-bent for lateral extension in the direction of its lesser bending resistance, and positioning said probing pipe in said well so that bending in the direction transverse to its longer cross-sectional axis will take place in a predetermined direction in azimuth.

References Cited in the file of this patent

UNITED STATES PATENTS

| | | |
|---|---|---|
| 287,909 | Cook | Nov. 6, 1883 |
| 385,600 | Durbrow | July 3, 1888 |
| 401,404 | Andrews | Apr. 16, 1889 |
| 565,342 | Frasch | Aug. 4, 1896 |
| 642,049 | Miller | Jan. 25, 1900 |
| 737,533 | Naillen | Aug. 25, 1903 |
| 1,062,050 | Stewart | May 20, 1913 |
| 1,395,091 | Cauerly | Oct. 25, 1921 |
| 1,644,553 | Trout | Oct. 4, 1927 |
| 1,660,999 | MacDonell | Feb. 28, 1928 |
| 1,900,163 | Dana et al. | Mar. 7, 1933 |
| 1,960,932 | Tracy | May 29, 1934 |
| 2,009,534 | Trump | July 30, 1935 |
| 2,092,511 | Henry | Sept. 7, 1937 |
| 2,172,683 | Reed | Sept. 12, 1939 |
| 2,190,235 | Huber | Feb. 13, 1940 |
| 2,204,018 | Kingsley | June 11, 1940 |
| 2,251,916 | Cross | Aug. 12, 1941 |
| 2,271,005 | Grebe | Jan. 27, 1942 |
| 2,332,940 | Senke | Oct. 26, 1943 |
| 2,344,277 | Zublin | Mar. 14, 1944 |
| 2,382,933 | Zublin | Aug. 14, 1945 |
| 2,402,497 | Johnson | June 18, 1946 |
| 2,438,293 | Livingston | Mar. 23, 1948 |
| 2,521,976 | Hays | Sept. 12, 1950 |

OTHER REFERENCES

"More Oil From Crooked Wells," from Scientific American, August 1939, pages 85, 86 and 87.